United States Patent
Nelson et al.

(10) Patent No.: US 8,059,811 B2
(45) Date of Patent: Nov. 15, 2011

(54) SYSTEM AND METHOD FOR CONTROLLING A CALL PROCESSING SYSTEM

(75) Inventors: Tracy Lee Nelson, Shawnee Mission, KS (US); Charles Arthur Jennings, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1771 days.

(21) Appl. No.: 11/066,094

(22) Filed: Feb. 24, 2005

(65) Prior Publication Data

US 2005/0152509 A1   Jul. 14, 2005

Related U.S. Application Data

(63) Continuation of application No. 09/317,103, filed on May 21, 1999, now Pat. No. 6,895,088.

(51) Int. Cl.
*H04M 7/00* (2006.01)
*H04M 3/22* (2006.01)
(52) U.S. Cl. .................................... 379/219; 379/32.05
(58) Field of Classification Search .................. 379/219, 379/225, 227, 32.05
See application file for complete search history.

(56) References Cited

U.S. PATENT DOCUMENTS

| | | | |
|---|---|---|---|
| 4,491,945 A | 1/1985 | Turner | |
| 4,683,584 A | 7/1987 | Chang et al. | |
| 4,686,669 A | 8/1987 | Chang | |
| 4,686,701 A | 8/1987 | Ahmad et al. | |
| 4,720,850 A | 1/1988 | Oberlander et al. | |
| 4,730,312 A | 3/1988 | Johnson et al. | |
| 4,736,364 A | 4/1988 | Basso et al. | |
| 4,748,658 A | 5/1988 | Gopal et al. | |
| 4,757,526 A | 7/1988 | Foster et al. | |
| 4,763,317 A | 8/1988 | Lehman et al. | |
| 4,799,153 A | 1/1989 | Hann et al. | |
| 4,853,955 A | 8/1989 | Thorn et al. | |
| 4,970,721 A | 11/1990 | Aczel et al. | |
| 4,991,169 A | 2/1991 | Davis et al. | |
| 4,991,172 A | 2/1991 | Cidon et al. | |

(Continued)

FOREIGN PATENT DOCUMENTS

EP  0439098  7/1991

(Continued)

OTHER PUBLICATIONS

Kuribayashi, Shin-Ichi; Advanced Signaling Protocol for Broadband ISDN Services; Electronics and Communications in Japan; Part 1, vol. 78, No. 1, pp. 1-12.

(Continued)

*Primary Examiner* — Rasha Al Aubaidi

(57) ABSTRACT

A communication system that comprises call processors, interworking units, and a control system handles a plurality of calls. The call processors process signaling messages for the calls, and in response, transfer control messages for the calls and transfer data messages for the calls. The interworking units receive the control messages and user communications for the calls and interwork the user communications between a first communication format and a second communication format in response to the control messages. The control system receives and processes the data messages for the calls to maintain an active call database having call data for active ones of the calls. The control system receives a query, and in response, processes the active call database to identify one of the active calls that satisfies the query.

20 Claims, 21 Drawing Sheets

U.S. PATENT DOCUMENTS

| | | |
|---|---|---|
| 5,003,584 A | 3/1991 | Benyacar et al. |
| 5,029,199 A | 7/1991 | Jones et al. |
| 5,048,081 A | 9/1991 | Gavaras et al. |
| 5,051,983 A | 9/1991 | Kammerl |
| 5,084,816 A | 1/1992 | Boese et al. |
| 5,089,954 A | 2/1992 | Rago |
| 5,115,426 A | 5/1992 | Spanke |
| 5,115,427 A | 5/1992 | Johnson, Jr. et al. |
| 5,185,743 A | 2/1993 | Murayama et al. |
| 5,204,857 A | 4/1993 | Obara |
| 5,251,255 A | 10/1993 | Epley |
| 5,258,979 A | 11/1993 | Oomuro et al. |
| 5,268,895 A | 12/1993 | Topper |
| 5,271,010 A | 12/1993 | Miyake et al. |
| 5,274,635 A | 12/1993 | Rahman et al. |
| 5,274,698 A | 12/1993 | Jang |
| 5,278,972 A | 1/1994 | Baker et al. |
| 5,282,244 A | 1/1994 | Fuller et al. |
| 5,289,472 A | 2/1994 | Cho |
| 5,291,492 A | 3/1994 | Andrews et al. |
| 5,297,147 A | 3/1994 | Shimokasa |
| 5,303,290 A | 4/1994 | Redberg et al. |
| 5,305,312 A | 4/1994 | Fornek et al. |
| 5,307,399 A | 4/1994 | Dai et al. |
| 5,327,421 A | 7/1994 | Hiller et al. |
| 5,329,308 A | 7/1994 | Binns et al. |
| 5,339,318 A | 8/1994 | Tanaka et al. |
| 5,345,443 A | 9/1994 | D'Ambrogio et al. |
| 5,345,445 A | 9/1994 | Hiller et al. |
| 5,345,446 A | 9/1994 | Hiller et al. |
| 5,363,433 A | 11/1994 | Isono |
| 5,375,124 A | 12/1994 | D'Ambrogio et al. |
| 5,377,186 A | 12/1994 | Wegner et al. |
| 5,392,402 A | 2/1995 | Robrock, II |
| 5,394,463 A | 2/1995 | Fischell et al. |
| 5,408,419 A | 4/1995 | Wong |
| 5,420,858 A | 5/1995 | Marshall et al. |
| 5,422,882 A | 6/1995 | Hiller et al. |
| 5,425,090 A | 6/1995 | Orriss |
| 5,428,609 A | 6/1995 | Eng et al. |
| 5,434,852 A | 7/1995 | La Porta et al. |
| 5,434,981 A | 7/1995 | Lenihan et al. |
| 5,438,527 A | 8/1995 | Feldbaumer et al. |
| 5,438,570 A | 8/1995 | Karras et al. |
| 5,440,563 A | 8/1995 | Isidoro et al. |
| 5,440,626 A | 8/1995 | Boyle et al. |
| 5,444,713 A | 8/1995 | Backaus et al. |
| 5,452,297 A | 9/1995 | Hiller et al. |
| 5,452,350 A | 9/1995 | Reynolds et al. |
| 5,457,684 A | 10/1995 | Bharucha et al. |
| 5,459,722 A | 10/1995 | Sherif |
| 5,469,501 A | 11/1995 | Otsuka |
| 5,473,630 A | 12/1995 | Penzias et al. |
| 5,473,677 A | 12/1995 | D'Amato et al. |
| 5,473,679 A | 12/1995 | La Porta et al. |
| 5,483,527 A | 1/1996 | Doshi et al. |
| 5,485,455 A | 1/1996 | Dobbins et al. |
| 5,495,484 A | 2/1996 | Self et al. |
| 5,506,894 A | 4/1996 | Billings et al. |
| 5,509,010 A | 4/1996 | La Porta et al. |
| 5,519,690 A | 5/1996 | Suzuka et al. |
| 5,519,707 A | 5/1996 | Subramanian et al. |
| 5,519,770 A | 5/1996 | Stein |
| 5,530,724 A | 6/1996 | Abrams et al. |
| 5,533,115 A | 7/1996 | Hollenbach et al. |
| 5,537,461 A | 7/1996 | Bridges et al. |
| 5,541,917 A | 7/1996 | Farris |
| 5,544,163 A | 8/1996 | Madonna |
| 5,546,442 A | 8/1996 | Foladare et al. |
| 5,550,834 A | 8/1996 | D'Ambrogio et al. |
| 5,550,914 A | 8/1996 | Clarke et al. |
| 5,557,664 A | 9/1996 | Burns et al. |
| 5,563,939 A | 10/1996 | La Porta et al. |
| 5,566,173 A | 10/1996 | Steinbrecher |
| 5,566,229 A | 10/1996 | Hou et al. |
| 5,568,475 A | 10/1996 | Doshi et al. |
| 5,577,037 A | 11/1996 | Takatori et al. |
| 5,579,311 A | 11/1996 | Chopping et al. |
| 5,586,177 A | 12/1996 | Farris et al. |
| 5,590,133 A | 12/1996 | Billström et al. |
| 5,592,477 A | 1/1997 | Farris et al. |
| 5,600,643 A | 2/1997 | Robrock, II |
| 5,610,977 A | 3/1997 | Williams et al. |
| 5,619,561 A | 4/1997 | Reese |
| 5,623,491 A | 4/1997 | Skoog |
| 5,631,950 A | 5/1997 | Brown |
| 5,635,980 A | 6/1997 | Lin et al. |
| 5,636,261 A | 6/1997 | Fils |
| 5,640,446 A | 6/1997 | Everett et al. |
| 5,666,399 A | 9/1997 | Bales et al. |
| 5,673,262 A | 9/1997 | Shimizu |
| 5,689,550 A | 11/1997 | Garson et al. |
| 5,689,555 A | 11/1997 | Sonnenberg |
| 5,701,301 A | 12/1997 | Weisser, Jr. |
| 5,703,876 A | 12/1997 | Christie |
| 5,703,880 A | 12/1997 | Miura |
| 5,706,286 A | 1/1998 | Reiman et al. |
| 5,710,769 A | 1/1998 | Anderson et al. |
| 5,715,239 A | 2/1998 | Hyodo et al. |
| 5,727,057 A | 3/1998 | Emery et al. |
| 5,745,553 A | 4/1998 | Mirville et al. |
| 5,751,706 A | 5/1998 | Land et al. |
| 5,765,108 A | 6/1998 | Martin et al. |
| 5,774,530 A | 6/1998 | Montgomery et al. |
| 5,774,675 A | 6/1998 | Uchida |
| 5,784,371 A | 7/1998 | Iwai |
| 5,793,765 A | 8/1998 | Boer et al. |
| 5,793,857 A | 8/1998 | Barnes et al. |
| 5,802,045 A | 9/1998 | Kos et al. |
| 5,825,780 A | 10/1998 | Christie |
| 5,828,666 A | 10/1998 | Focsaneanu et al. |
| 5,850,391 A | 12/1998 | Essigmann |
| 5,862,334 A | 1/1999 | Schwartz et al. |
| 5,864,862 A | 1/1999 | Kriens et al. |
| 5,867,495 A | 2/1999 | Elliott et al. |
| 5,867,562 A | 2/1999 | Scherer |
| 5,867,571 A | 2/1999 | Borchering |
| 5,872,779 A | 2/1999 | Vaudreuil |
| 5,872,785 A | 2/1999 | Kienberger |
| 5,884,262 A | 3/1999 | Wise et al. |
| 5,892,764 A | 4/1999 | Riemann et al. |
| 5,915,009 A | 6/1999 | Williams et al. |
| 5,920,562 A | 7/1999 | Christie et al. |
| 5,926,464 A | 7/1999 | Fraser |
| 5,940,393 A | 8/1999 | Duree et al. |
| 5,940,491 A | 8/1999 | Anderson et al. |
| 5,940,492 A | 8/1999 | Galloway et al. |
| 5,949,791 A | 9/1999 | Byers et al. |
| 5,949,871 A | 9/1999 | Kabay et al. |
| 5,956,334 A | 9/1999 | Chu et al. |
| RE36,416 E | 11/1999 | Szlam et al. |
| 5,991,301 A | 11/1999 | Christie |
| 5,999,525 A | 12/1999 | Krishnaswamy et al. |
| 5,999,594 A | 12/1999 | Mizoguchi et al. |
| 6,002,689 A | 12/1999 | Christie et al. |
| 6,014,378 A | 1/2000 | Christie et al. |
| 6,026,091 A | 2/2000 | Christie et al. |
| 6,031,840 A | 2/2000 | Christie et al. |
| 6,034,950 A | 3/2000 | Sauer et al. |
| 6,038,218 A | 3/2000 | Otsuka et al. |
| 6,069,890 A | 5/2000 | White et al. |
| 6,088,749 A | 7/2000 | Hebert et al. |
| 6,122,294 A | 9/2000 | Hsu et al. |
| 6,137,800 A | 10/2000 | Wiley et al. |
| 6,141,339 A | 10/2000 | Kaplan et al. |
| 6,144,658 A | 11/2000 | Lebizay et al. |
| 6,169,735 B1 | 1/2001 | Allen, Jr. et al. |
| 6,175,574 B1 | 1/2001 | Lewis |
| 6,181,703 B1 | 1/2001 | Christie et al. |
| 6,185,215 B1 | 2/2001 | Aho |
| 6,208,618 B1 | 3/2001 | Kenney et al. |
| 6,208,637 B1 | 3/2001 | Eames |
| 6,249,572 B1 | 6/2001 | Brockman et al. |
| 6,314,103 B1* | 11/2001 | Medhat et al. ............ 370/395.2 |
| 6,324,173 B1 | 11/2001 | Deschaine et al. |
| 6,324,179 B1 | 11/2001 | Doshi et al. |
| 6,324,279 B1 | 11/2001 | Kalmanek, Jr. et al. |

| | | |
|---|---|---|
| 6,327,270 B1 | 12/2001 | Christie et al. |
| 6,377,673 B1 | 4/2002 | Cho et al. |
| 6,430,195 B1 | 8/2002 | Christie et al. |
| 6,449,259 B1 | 9/2002 | Allain et al. |
| 6,483,837 B1 * | 11/2002 | Howell et al. ............. 370/395.3 |
| 6,487,200 B1 | 11/2002 | Fraser |
| 6,496,512 B1 | 12/2002 | Medhat |
| 6,501,753 B1 | 12/2002 | Lin et al. |
| 6,546,003 B1 | 4/2003 | Farris |
| 6,546,442 B1 | 4/2003 | Davis et al. |
| 6,560,241 B2 | 5/2003 | Christie et al. |
| 6,574,216 B1 | 6/2003 | Farris et al. |
| 6,597,701 B1 | 7/2003 | Howell |
| 6,628,653 B1 | 9/2003 | Salim |
| 6,667,982 B2 | 12/2003 | Christie et al. |
| 6,674,745 B1 | 1/2004 | Schuster et al. |
| 6,690,674 B1 | 2/2004 | Christie et al. |
| 6,721,306 B1 | 4/2004 | Farris et al. |
| 6,765,903 B1 | 7/2004 | Allen, Jr. et al. |
| 6,785,282 B1 | 8/2004 | Gardner |
| 6,847,611 B1 | 1/2005 | Chase et al. |
| 7,103,068 B1 | 9/2006 | Gardner et al. |
| 2002/0097725 A1 | 7/2002 | Dighe et al. |
| 2003/0007492 A1 | 1/2003 | Christie et al. |
| 2004/0174880 A1 | 9/2004 | White et al. |
| 2004/0193329 A1 | 9/2004 | Ransom et al. |
| 2005/0163110 A1 | 7/2005 | Howell |
| 2006/0023676 A1 | 2/2006 | Whitmore et al. |
| 2006/0251089 A1 | 11/2006 | Medhat |

FOREIGN PATENT DOCUMENTS

| | | |
|---|---|---|
| EP | 0 488 399 | 6/1992 |
| HU | 71152 | 11/1995 |
| JP | 1013534 | 1/1989 |
| JP | 1300738 | 12/1989 |
| JP | 2215247 | 8/1990 |
| JP | 4180324 | 6/1992 |
| JP | 4196635 | 7/1992 |
| JP | 5327751 | 12/1993 |
| JP | 6006320 | 1/1994 |
| JP | 6209365 | 7/1994 |
| JP | 7177061 | 7/1995 |
| JP | 7250099 | 9/1995 |
| JP | 8149137 | 6/1996 |
| WO | WO9214321 | 8/1992 |

OTHER PUBLICATIONS

Hungarian office action dated Jun. 23, 1999 citing Hungarian patent No. HU170127 for Hungarian Application No. P9900232; 2 pages.

Russian office action dated Apr. 22, 2002 citing Russian patent Nos. RU2013011 and RU2007880 for Russian Application No. 99112956; 6 pages.

Hiroshi Ishii and Masatoshi Kawarasaki; B-ISDN Signalling Protocol Capabilities; NTT Telecommunication Networks Laboratories; 1989; pp. 41.2.1-41.2.5.

David J. Wright; "Voice over ATM: An Evaluation of Network Architecture Alternatives," IEEE Network; Sep./Oct. 1996; pp. 22-27.

* cited by examiner

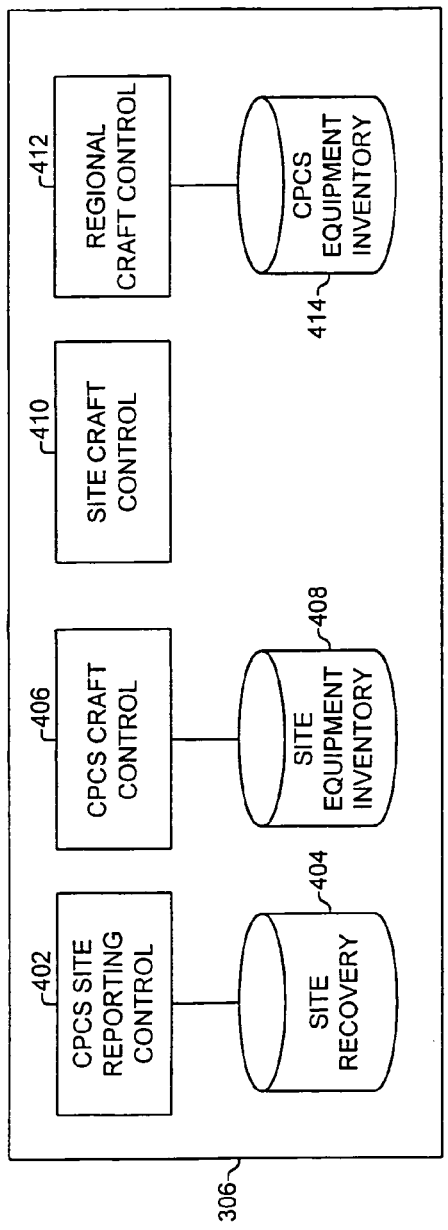
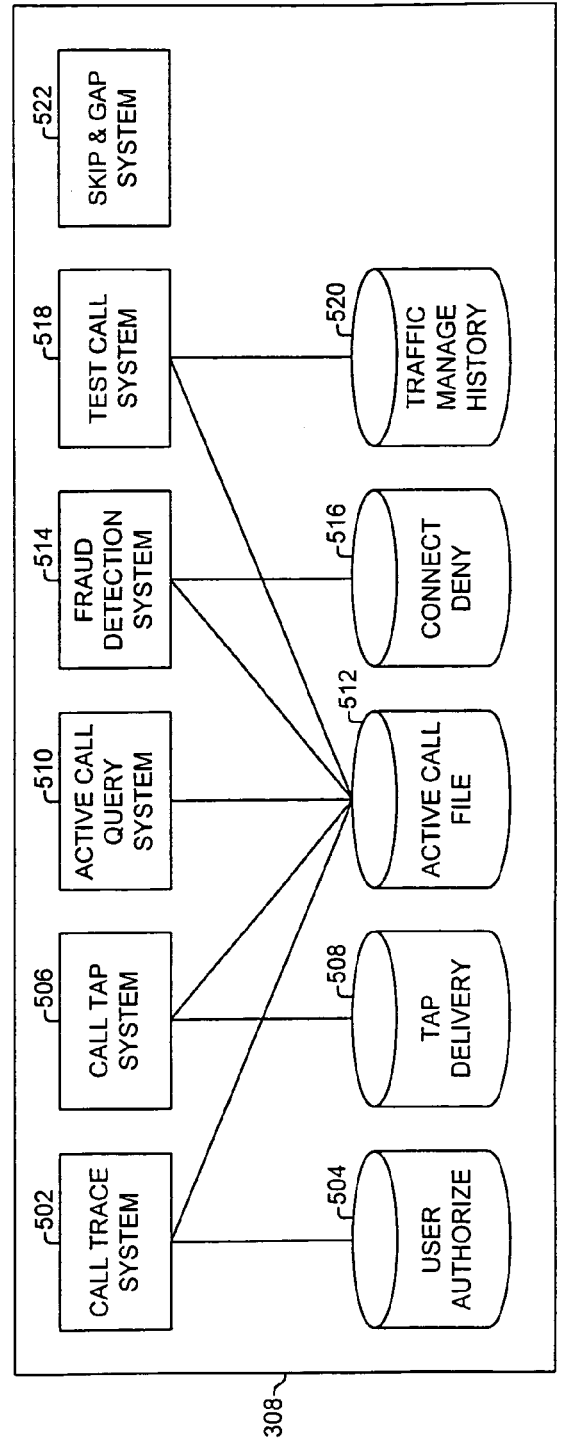

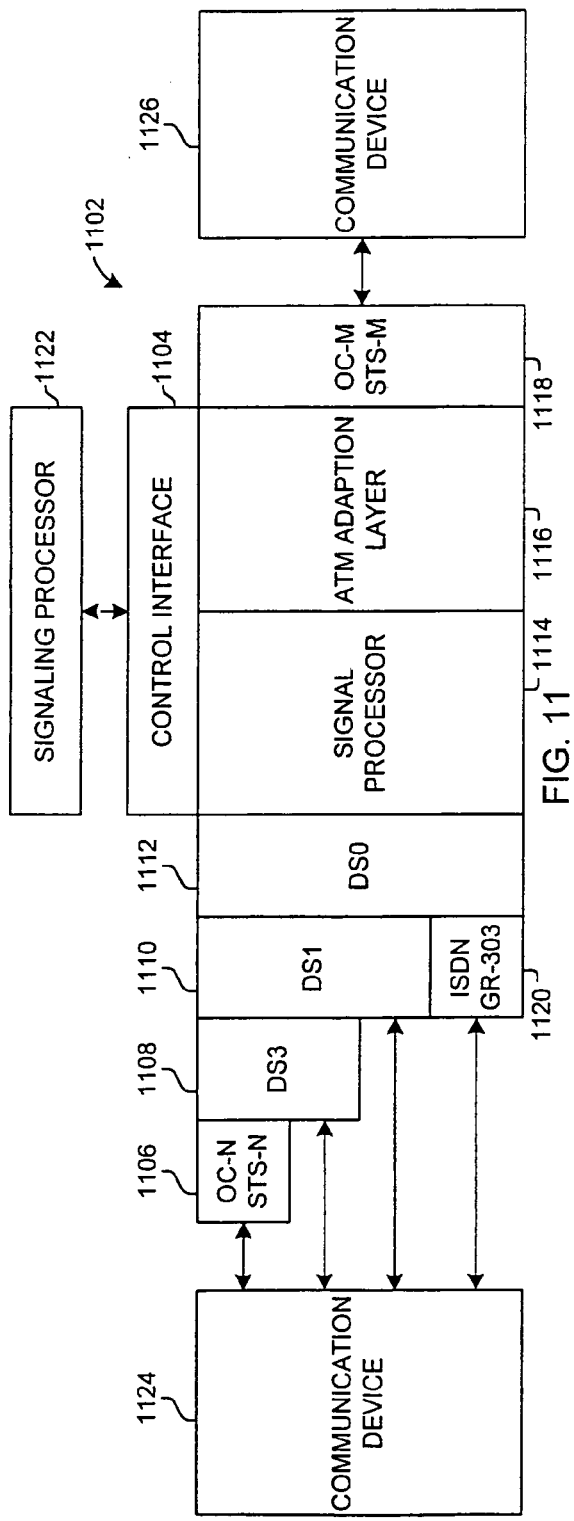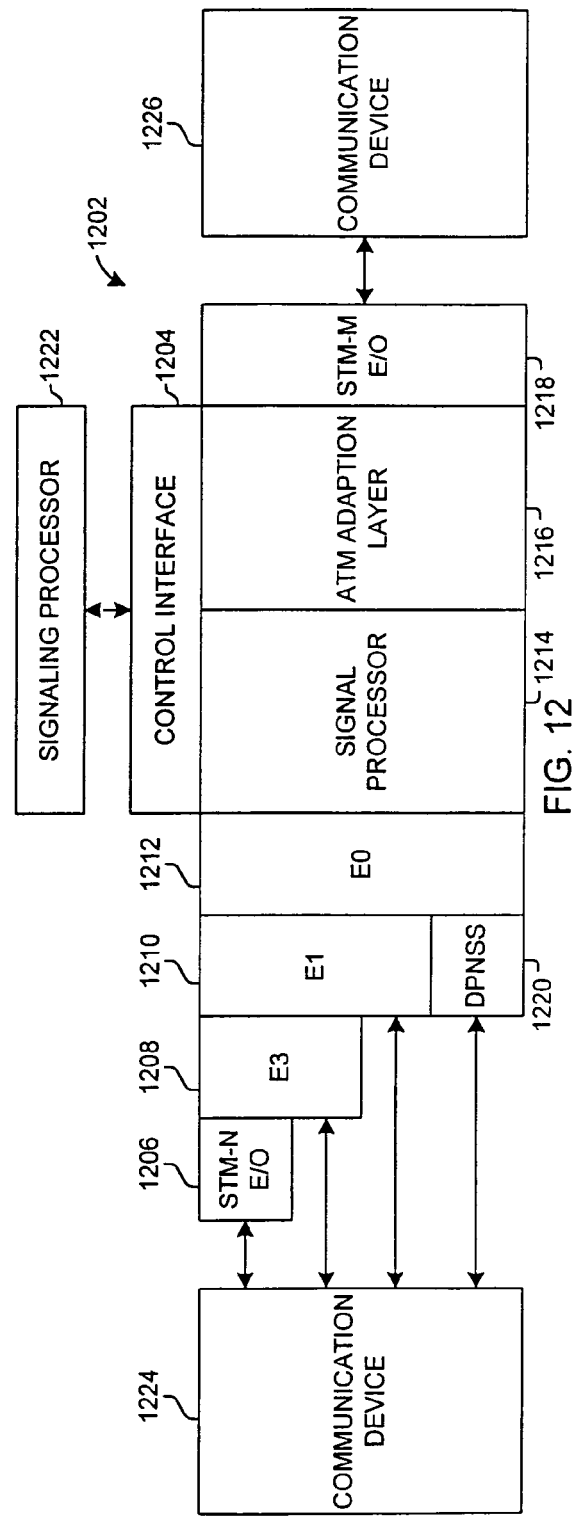

| TRUNK GROUP NUMBER | GROUP MEMBER | TCIC | EC LABEL | IWU LABEL | IWU PORT | DS1/E1 LABEL | DS1/E1 CHANNEL | INITIAL STATE |
|---|---|---|---|---|---|---|---|---|
|  |  |  |  |  |  |  |  |  |
|  |  |  |  |  |  |  |  |  |

FIG. 18

| TRUNK GROUP NUMBER | GROUP SIZE | STARTING CIC | TRANSMIT INTERFACE LABEL | TRANSMIT VPI | RECEIVE INTERFACE LABEL | RECEIVE VPI | INITIAL STATE |
|---|---|---|---|---|---|---|---|
|  |  |  |  |  |  |  |  |
|  |  |  |  |  |  |  |  |

FIG. 19

| TRUNK GROUP NUMBER | ADMIN INFORMATION | ASSOCIATED POINT CODE | CLLI | TRUNK TYPE | ASSOCIATED NPA | ASSOCIATED JIP | TIME ZONE LABEL | ECHO CANCELLER INFORMATION |
|---|---|---|---|---|---|---|---|---|
|  |  |  |  |  |  |  |  |  |
|  |  |  |  |  |  |  |  |  |

FIG. 20A

| SATELLITE | SELECT SEQUENCE | IWU PRIORITY | GLARE RESOLUTION | CONTINUITY CONTROL | REATTEMPTS | IGNORE LNP INFORMATION | TREATMENT LABEL | MESSAGE MAPPING LABEL |
|---|---|---|---|---|---|---|---|---|
|  |  |  |  |  |  |  |  |  |
|  |  |  |  |  |  |  |  |  |

FIG. 20B

| QUEUE | RING NO ANSWER | VOICE PATH CUT THROUGH | ORIGINATING COS LABEL | TERMINATING COS LABEL | CALL CONTROL | NEXT FUNCTION | NEXT LABEL |
|---|---|---|---|---|---|---|---|
|  |  |  |  |  |  |  |  |
|  |  |  |  |  |  |  |  |

FIG. 20C

| CARRIER LABEL | CARRIER ID | CARRIER SELECTION | NEXT FUNCTION | NEXT LABEL |
|---|---|---|---|---|
| | | | | |
| | | | | |

FIG. 21

| EXCEPTION LABEL | CALLING PARTY'S CATEGORY | CALLED NUMBER | | NEXT FUNCTION | NEXT LABEL |
|---|---|---|---|---|---|
| | | NATURE OF ADDRESS | DIGITS FROM | DIGITS TO | | |
| | | | | | | |
| | | | | | | |

FIG. 22

| OLI LABEL | ORIGINATION LINE INFORMATION | NEXT FUNCTION | NEXT LABEL |
|---|---|---|---|
| | | | |
| | | | |

FIG. 23

| ANI LABEL | CHARGE CALLING PARTY NUMBER | | TIME ZONE LABEL | CUSTOMER INFORMATION | EC INFORMATION | QUEUE TREATMENT LABEL | NEXT FUNCTION | NEXT LABEL |
|---|---|---|---|---|---|---|---|---|
| | DIGITS FROM | DIGITS TO | | | | | | |
| | | | | | | | | |
| | | | | | | | | |

FIG. 24

| CALLED NUMBER SCREENING LABEL | CALLED NUMBER | | | DELETE DIGITS | NEXT FUNCTION | NEXT LABEL |
|---|---|---|---|---|---|---|
| | NATURE OF ADDRESS | DIGITS FROM | DIGITS TO | | | |
| | | | | | | |
| | | | | | | |

| CALLED NUMBER LABEL | CALLED NUMBER | | | NEXT FUNCTION | NEXT LABEL |
|---|---|---|---|---|---|
| | NATURE OF ADDRESS | DIGITS FROM | DIGITS TO | | |
| | | | | | |

FIG. 27

| DAY OF YEAR LABEL | DATE | NEXT FUNCTION | NEXT LABEL |
|---|---|---|---|
| | | | |

FIG. 28

| DAY OF WEEK LABEL | DAY FROM | DAY TO | NEXT FUNCTION | NEXT LABEL |
|---|---|---|---|---|
| | | | | |

FIG. 29

| TIME OF DAY LABEL | TIME FROM | TIME TO | NEXT FUNCTION | NEXT LABEL |
|---|---|---|---|---|
| | | | | |

FIG. 30

| TIME ZONE LABEL | UTC OFFSET | DAYLIGHT SAVINGS |
|---|---|---|
| | | |

| ROUTING LABEL | ROUTE NUMBER | NEXT FUNCTION | NEXT LABEL | SIGNAL ROUTE LABEL |
|---|---|---|---|---|
| | | | | |
| | | | | |

FIG. 31

| ORIGINATING TRUNK COS LABEL | TERMINATING TRUNK COS LABEL | NEXT FUNCTION | NEXT LABEL |
|---|---|---|---|
| | | | |
| | | | |

FIG. 32

| TREATMENT LABEL | ERROR/CAUSE LABEL | NEXT FUNCTION | NEXT LABEL |
|---|---|---|---|
| | | | |
| | | | |

FIG. 33

| OUTGOING RELEASE LABEL | OUTGOING CAUSE VALUE | | |
|---|---|---|---|
| | LOCATION | CODING STANDARD | CAUSE VALUE |
| | | | |
| | | | |

FIG. 34

| PERCENT LABEL | CONTROL | | PASSED | |
|---|---|---|---|---|
| | CONTROL PERCENTAGE | NEXT FUNCTION | NEXT LABEL | NEXT FUNCTION | NEXT LABEL |
| | | | | | |
| | | | | | |

FIG. 35

| CALL RATE LABEL | CALL RATE | CONTROL | | PASSED |
|---|---|---|---|---|
| | | NEXT FUNCTION | NEXT LABEL | NEXT LABEL |
| | | | | |
| | | | | |

FIG. 36

| DATABASE SERVICES LABEL | SERVICE TYPE | SCCP LABEL | TCAP LABEL | NEXT FUNCTION | NEXT LABEL |
|---|---|---|---|---|---|
| | | | | | |
| | | | | | |

FIG. 37

| SCCP LABEL | MESSAGE TYPE | PROTOCOL CLASS | MESSAGE HANDLING | HOP COUNTER | SEGMENTATION |
|---|---|---|---|---|---|
| | | | | | |
| | | | | | |

FIG. 38A

| | ISNI | | |
|---|---|---|---|
| ISNI TYPE | ROUTE INDICATOR | MARK INDICATOR | LABEL |
| | | | |
| | | | |

FIG. 38B

| CALLED PARTY ADDRESS | | | | | | GLOBAL TITLE | | | |
|---|---|---|---|---|---|---|---|---|---|
| ADDRESS INDICATOR | | | | POINT CODE NUMBER | SUB SYSTEM NUMBER | | | | |
| SSN | POINT CODE | GLOBAL TITLE INDICATOR | ROUTING INDICATOR | NATIONAL/ INTERNATIONAL INDICATOR | | | TRANSLATION TYPE | ENCODE SCHEME | NUMBER PLAN | ADDRESS TYPE |
| | | | | | | | | | | |
| | | | | | | | | | | |

| | CALLING PARTY ADDRESS | | | | | | | | |
|---|---|---|---|---|---|---|---|---|---|
| | ADDRESS INDICATOR | | | | SUB SYSTEM NUMBER | POINT CODE NUMBER | GLOBAL TITLE | | |
| SSN | POINT CODE | GLOBAL TITLE INDICATOR | ROUTING INDICATOR | NATIONAL/ INTERNATIONAL | | | TRANSLATION TYPE | ENCODE SCHEME | NUMBER PLAN | ADDRESS TYPE |
| | | | | | | | | | | |
| | | | | | | | | | | |

FIG. 39

| ISNI LABEL | NETWORK 1 | NETWORK 2 | NETWORK 3 | NETWORK ... | NETWORK 16 |
|---|---|---|---|---|---|
| | | | | | |
| | | | | | |

FIG. 40

| TCAP LABEL | TCAP TYPE | TAG CLASS | PACKAGE TYPE | COMPONENT TYPE | MESSAGE TYPE |
|---|---|---|---|---|---|
| | | | | | |
| | | | | | |

FIG. 41

| ECHO CANCELLER LABEL | ECHO CANCELLER TYPE | RS-232 ADDRESS | MODULE |
|---|---|---|---|
| | | | |
| | | | |

FIG. 42

| IWU LABEL | IWU ID | IP SOCKET 1 | IP SOCKET 2 | IP SOCKET 3 | IP SOCKET 4 |
|---|---|---|---|---|---|
| | | | | | |
| | | | | | |

FIG. 43

| CAM INTERFACE LABEL | CAM LABEL | LOGICAL INTERFACE |
|---|---|---|
| | | |
| | | |

| CAM LABEL | CAM TYPE | CAM ADDRESS |
|---|---|---|
| | | |
| | | |

FIG. 44

| OFFICE CLLI NAME | SITE NODE ID | ORIGINATION ID | SOFTWARE ID | CALL PROCESSOR ID |
|---|---|---|---|---|
| | | | | |
| | | | | |

FIG. 45A

| ACC ENABLED | ACL 1 ONSET | ACL 1 ABATE | ACL 2 ONSET | ACL 2 ABATE | ACL 3 ONSET | ACL 3 ABATE |
|---|---|---|---|---|---|---|
| | | | | | | |
| | | | | | | |

FIG. 45B

| MAX TRUNKS OHQ | OHQ TQ1 | OHQ TQ2 | RING NO ANSWER TIMER | BILLING ACTIVE | NWM ALLOW | BILLING FAILURE FREE CALL |
|---|---|---|---|---|---|---|
| | | | | | | |
| | | | | | | |

FIG. 45C

| MAX HOP COUNTS | MAX TABLE LOOKUPS |
|---|---|
| | |
| | |

FIG. 45D

| AIN EVENT PARAMETERS LABEL | MESSAGE NAME #1 | MESSAGE NAME #.... | MESSAGE NAME #N |
|---|---|---|---|
| ACCESS CODE | | | |
| ACG ENCOUNTERED | | | |
| ALTERNATE BILLING INDICATOR | | | |
| ALTERNATE TRUNK GROUP | | | |
| AMA ALTERNATE BILLING NUMBER | | | |
| AMA BUSINESS CUSTOMER ID | | | |
| AMA DIGITS DIALED WC | | | |
| AMA LINE NUMBER | | | |
| AMA SLPID | | | |
| AMP | | | |
| ANSWER INDICATOR | | | |
| BEARER CAPABILITY | | | |
| BUSY CAUSE | | | |
| CALLED PARTY ID | | | |
| CALLED PARTY STATION TYPE | | | |
| CALLING PARTY BGID | | | |
| CARRIER | | | |
| CHARGE NUMBER | | | |
| CHARGE PARTY STATION TYPE | | | |
| CLEAR CAUSE | | | |
| COLLECTED ADDRESS INFORMATION | | | |
| COLLECTED DIGITS | | | |
| CONTROLLING LEG TREATMENT | | | |
| DISCONNECT FLAG | | | |
| DISPLAY TEXT | | | |
| FACILITY GID (TRUNK GROUP ID) | | | |
| FACILITY GID (PRIVATE FACILITY GID) | | | |
| FACILITY GID (ROUTE INDEX) | | | |
| FACILITY MEMBER ID | | | |
| FAILURE CAUSE | | | |
| GENERIC NAME | | | |
| ISDN INTERFACE ID | | | |
| LATA | | | |
| ORIGINAL CALLED PARTY ID | | | |
| OUTPULSE NUMBER | | | |
| OVERFLOW BILLING NUMBER | | | |
| PASSIVE LEG TREATMENT | | | |
| PRIMARY BILLING INDICATOR | | | |
| PRIMARY CARRIER | | | |
| PRIMARY TRUNK GROUP | | | |
| REDIRECTING PARTY ID | | | |
| REDIRECTION INFORMATION | | | |
| RESOURCE TYPE | | | |
| SECOND ALTERNATE BILLING INDICATOR | | | |
| SECOND ALTERNATE CARRIER | | | |
| SECOND ALTERNATE TRUNK GROUP | | | |
| SPID | | | |
| STR PARAMETER BLOCK | | | |

FIG. 46A

| AIN EVENT PARAMETERS LABEL | MESSAGE NAME #1 | MESSAGE NAME #.... | MESSAGE NAME #N |
|---|---|---|---|
| TCM | | | |
| TRIGGER CRITERIA TYPE | | | |
| USER ID | | | |
| VERTICAL SERVICE CODE | | | |
| APPLICATION ERROR STRING | | | |
| ERROR CAUSE | | | |
| FAILED MESSAGE | | | |
| CONNECT TIME | | | |
| CONTROL CAUSE INDICATOR | | | |
| ECHO DATA | | | |
| FACILITY STATUS | | | |
| GAP DURATION | | | |
| GAP INTERVAL (NATIONAL GAP INTERVAL) | | | |
| GAP INTERVAL (PRIVATE GAP INTERVAL) | | | |
| GLOBAL TITLE VALUE | | | |
| MONITOR TIME | | | |
| STATUS CAUSE | | | |
| TERMINATION INDICATOR | | | |
| TRANSLATION TYPE | | | |
| TRIGGER CRITERIA FLAG | | | |

FIG. 46B

| MESSAGE TYPE | PARAMETERS | INDEX #1 | INDEX #.... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | PRIVATE OPTIONAL | | | |
| ANSWER | ACCESS TRANSPORT | | | |
| | BACKWARD CALL INDICATOR | | | |
| | PRIVATE OPTIONAL | | | |
| CALL PROGRESS | NOTIFICATION | | | |
| | BACKWARD CALL INDICATOR | | | |
| | ACCESS TRANSPORT | | | |
| | CAUSE INDICATOR | | | |
| | BACKWARD CALL INDICATOR | | | |
| CIRCUIT VALIDATION RESPONSE MESSAGE | CIRCUIT ID NAME | | | |
| | CLLI CODE | | | |
| CONTINUITY | CONTINUITY INDICATOR | | | |
| EXIT | DISPOSITION | | | |
| | TRUNK GROUP NUMBER | | | |
| | SEND BACK EXIT MESSAGE | | | |
| INITIAL ADDRESS | FORWARD CALL INDICATOR | | | |
| | CALLING PARTY'S CATEGORY | | | |
| | GENERIC ADDRESS PARAMETER (LNP) | | | |
| | CALLED PARTY NUMBER | | | |
| | CALLING PARTY NUMBER | | | |
| | GENERIC DIGITS | | | |
| | CHARGE NUMBER | | | |
| | ORIGINATING LINE INFORMATION | | | |
| | TRANSIT NETWORK SELECTION | | | |
| | CARRIER SELECTION INFORMATION | | | |
| | ORIGINATING LINE INFORMATION | | | |
| | SERVICE CODE | | | |
| | CARRIER IDENTIFICATION | | | |
| | ORIGINAL CALLED NUMBER | | | |
| | REDIRECTING NUMBER | | | |
| | REDIRECTION INFORMATION | | | |
| | GENERIC ADDRESS (NON-LNP) | | | |
| | ACCESS TRANSPORT | | | |
| | HOP COUNTER | | | |
| | JURISDICTION INFORMATION | | | |
| RELEASE | ACCESS TRANSPORT | | | |
| | AUTOMATIC CONGESTION CONTROL | | | |

FIG. 47

SYSTEM AND METHOD FOR CONTROLLING A CALL PROCESSING SYSTEM

RELATED APPLICATIONS

This patent application is a continuation of patent application Ser. No. 09/317,103, entitled "System and Method for Controlling A Call Processing System," filed on May 21, 1999, and that is hereby incorporated by reference into this patent application.

FEDERALLY SPONSORED RESEARCH OR DEVELOPMENT

Not Applicable

MICROFICHE APPENDIX

Not Applicable

FIELD OF THE INVENTION

The present invention relates to the field of administration of telecommunications call connecting management and transport devices.

BACKGROUND OF THE INVENTION

Broadband systems provide telecommunications providers with many benefits, including greater bandwidth, more efficient use of bandwidth, and the ability to integrate voice, data, and video communications. These broadband systems provide callers with increased capabilities at lower costs.

The broadband systems may have multiple elements that operate together to connect calls. Some elements may process call signaling while other elements make connections for calls. Alternately, a single element may be used to both process call signaling and to make connections for calls. In either system, there is a need for a system to provide for maintenance and administration of the elements. Such a system should be capable of providing the administration services for local or regional elements. The system of the present invention provides these needs.

SUMMARY OF THE INVENTION

Some examples of the invention include a communication system to handle a plurality of calls and its method of operation. The communication system includes a plurality of call processors, a plurality of interworking units, and a control system. The call processors process signaling messages for the calls, and in response, transfer control messages for the calls and transfer data messages for the calls. The interworking units receive the control messages and user communications for the calls and interwork the user communications between a first communication format and a second communication format in response to the control messages. The control system receives and processes the data messages for the calls to maintain an active call database having call data for active ones of the calls. The control system receives a query, and in response, processes the active call database to identify one of the active calls that satisfies the query.

BRIEF DESCRIPTION OF THE DRAWINGS

FIG. 4 is a block diagram of a fault management system in accordance with an embodiment of the present invention.

FIG. 5 is a block diagram of a remote call control system in accordance with an embodiment of the present invention.

FIG. 11 is a functional diagram of an asynchronous transfer mode interworking unit for use with a synchronous optical network system in accordance with the present invention.

FIG. 12 is a functional diagram of an asynchronous transfer mode interworking unit for use with a synchronous digital hierarchy system in accordance with the present invention.

FIG. 18 is a table diagram of a time division multiplex trunk circuit table used in the signaling processor of FIG. 14.

FIG. 19 is a table diagram of an asynchronous transfer mode trunk circuit table used in the signaling processor of FIG. 14.

FIG. 20A is a table diagram of a trunk group table used in the signaling processor of FIG. 14.

FIG. 20B is a continuation table diagram of the trunk group table of FIG. 20A.

FIG. 20C is a table diagram of a continuation of the trunk group table of FIG. 20B.

FIG. 21 is a table diagram of a carrier table used in the signaling processor of FIG. 14.

FIG. 22 is a table diagram of an exception table used in the signaling processor of FIG. 14.

FIG. 23 is a table diagram of an originating line information table used in the signaling processor of FIG. 14.

FIG. 24 is a table diagram of an automated number identification table used in the signaling processor of FIG. 14.

FIG. 25 is a table diagram of a called number screening table used in the signaling processor of FIG. 14.

FIG. 26 is a table diagram of a called number table used in the signaling processor of FIG. 14.

FIG. 27 is a table diagram of a day of year table used in the signaling processor of FIG. 14.

FIG. 28 is a table diagram of a day of week table used in the signaling processor of FIG. 14.

FIG. 29 is a table diagram of a time of day table used in the signaling processor of FIG. 14.

FIG. 30 is a table diagram of a time zone table used in the signaling processor of FIG. 14.

FIG. 31 is a table diagram of a routing table used in the signaling processor of FIG. 14.

FIG. 32 is a table diagram of a trunk group class of service table used in the signaling processor of FIG. 14.

FIG. 33 is a table diagram of a treatment table used in the signaling processor of FIG. 14.

FIG. 34 is a table diagram of an outgoing release table used in the signaling processor of FIG. 14.

FIG. 35 is a table diagram of a percent control table used in the signaling processor of FIG. 14.

FIG. 36 is a table diagram of a call rate table used in the signaling processor of FIG. 14.

FIG. 37 is a table diagram of a database services table used in the signaling processor of FIG. 14.

FIG. 38A is a table diagram of a signaling connection control part table used in the signaling processor of FIG. 14.

FIG. 38B is a continuation table diagram of the signaling connection control part table of FIG. 38A.

FIG. 38C is a continuation table diagram of the signaling connection control part table of FIG. 38B.

FIG. 38D is a continuation table diagram of the signaling connection control part table of FIG. 38C.

FIG. 39 is a table diagram of an intermediate signaling network identification table used in the signaling processor of FIG. 14.

FIG. 40 is a table diagram of a transaction capabilities application part table used in the signaling processor of FIG. 14.

FIG. 41 is a table diagram of a external echo canceller table used in the signaling processor of FIG. 14.

FIG. 42 is a table diagram of an interworking unit used in the signaling processor of FIG. 14.

FIG. 43 is a table diagram of a controllable asynchronous transfer mode matrix interface table used in the signaling processor of FIG. 14.

FIG. 44 is a table diagram of a controllable asynchronous transfer mode matrix table used in the signaling processor of FIG. 14.

FIG. 45A is a table diagram of a site office table used in the signaling processor of FIG. 14.

FIG. 45B is a continuation table diagram of the site office table of FIG. 45A.

FIG. 45C is a continuation table diagram of the site office table of FIG. 45B.

FIG. 45D is a continuation table diagram of the site office table of FIG. 45C.

FIG. 46A is a table diagram of an advanced intelligent network event parameters table used in the signaling processor of FIG. 14.

FIG. 46B is a continuation table diagram of the advanced intelligent network event parameters table of FIG. 46A.

FIG. 47 is a table diagram of a message mapping table used in the signaling processor of FIG. 14.

DETAILED DESCRIPTION OF THE PREFERRED EMBODIMENTS

Telecommunication systems have a number of communication devices in local exchange and interexchange environments that interact to provide call services to customers. Both traditional and intelligent network CIN) services and resources are used to process, route, or connect a call to a designated connection.

A call has user communications and call signaling. The user communications contain the caller's information, such as a voice communication or data communication, and they are transported over a connection. Call signaling contains information that facilitates call processing, and it is communicated over a link. Call signaling, for example, contains information describing the called number and the calling number. Examples of call signaling are standardized signaling, such as signaling system #7 (SS7), C7, integrated services digital network (ISDN), and digital private network signaling system (DPNSS), which are based on ITU recommendation Q.931. A call can be connected to and from communication devices.

Connections are used to transport user communications and other device information between communication devices and between the elements and devices of the system. The term "connection" as used herein means the transmission media used to carry user communications between elements of the various telecommunications networks and systems. For example, a connection could carry a user's voice, computer data, or other communication device data. A connection can be associated with either in-band communications or out-of-band communications.

Links are used to transport call signaling and control messages. The term "link" as used herein means a transmission media used to carry call signaling and control messages. For example, a link would carry call signaling or a device control message containing device instructions and data. A link can carry, for example, out-of-band signaling such as that used in SS7, C7, ISDN, DPNSS, B-ISDN, GR-303, or could be via local area network (LAN), or data bus call signaling. A link can be, for example, an asynchronous transfer mode (ATM) adaptation layer 5 (AAL5) data link, UDP/IP, ethernet, DS0, or DS1. In addition, a link, as shown in the figures, can represent a single physical link or multiple links, such as one link or a combination of links of ISDN, SS7, TCP/IP, or some other data link. The term "control message" as used herein means a control or signaling message, a control or signaling instruction, or a control or signaling signal, whether proprietary or standardized, that conveys information from one point to another.

Figure 1:
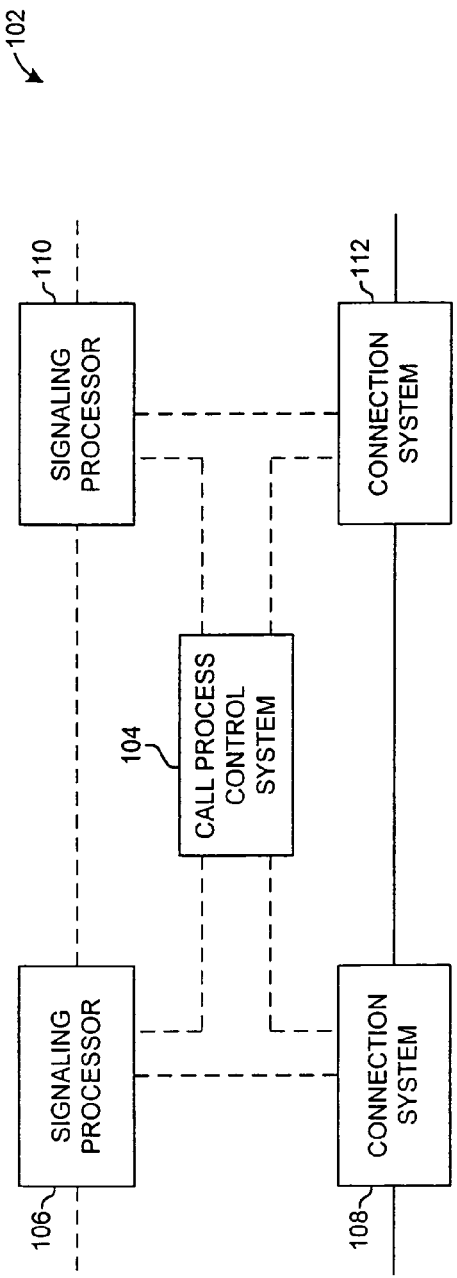
FIG. 1 is a block diagram of a regional call process control system in accordance with an embodiment of the present invention.

FIG. 1 illustrates an exemplary embodiment of a call processing system 102 of the present invention. The call processing system 102 has a management system, such as a call process control system (CPCS) 104, which is linked to a first signaling processor 106, a first connection system 108, a second signaling processor 110, and a second connection system 112.

The CPCS 104 is a management and administration system. The CPCS 104 is the user interface and external systems interface into the signaling processors 106 and 110 and the connection systems 108 and 112. The CPCS 104 serves as a collection point for call-associated data such as call processing and call routing data, logs, operational measurement data, alarms, statistical information, accounting information, and other call data. The CPCS 104 maintains and processes this data for accounting systems, alarm reporting systems, and other enterprise systems. The CPCS 104 maintains a security firewall between the enterprise systems and the other elements of the call processing system 102, such as the signaling processors 106 and 110.

The CPCS 104 accepts call processing data, such as the translations, from operations systems and updates data in call processing tables in the signaling processors 106 and 110. The CPCS 104 maintains a current, historical, and future view of the call processing tables. The CPCS 104 also provides configuration data and control to the elements of the call processing system 102 including the signaling processors 106 and 110 and the connection systems 108 and 112 and collects data from the elements.

In addition, the CPCS 104 provides for remote control of call processing, call processing applications, and other applications such as call monitoring and call tapping at the signaling processor 106 and 110. The CPCS may be a local CPCS that services only elements of a local signaling system or a regional CPCS that services elements of multiple signaling systems. In the embodiment of FIG. 1, the CPCS 104 is illustrated as a regional CPCS.

The signaling processors 106 and 110 are signaling platforms that can receive, process, and generate call signaling. Based on the processed call signaling, the signaling processors 106 and 110 select processing options, services, or resources for the user communications and generate and transmit control messages that identify the communication device, processing option, service, or resource that is to be used. The signaling processors 106 and 110 also select virtual connections and circuit-based connections for call routing and generate and transport control messages that identify the selected connections. The signaling processors 106 and 110 can process various forms of signaling, including ISDN, GR-303, B-ISDN, SS7, and C7. A preferred signaling processor is discussed below.

The connection systems 108 and 112 make connections for calls. The connection systems 108 and 112 may interwork user communications to connections or switch user communications between connections. Preferably, interworking occurs between time division multiplex (TDM) connections and asynchronous transfer mode (ATM) connections, and switching occurs between ATM connections and other ATM connections and between TDM connections and other TDM connections. The connection systems 108 and 112 establish connections for user communications in response to control messages from the signaling processors 106 and 110, respectively.

Figure 2:
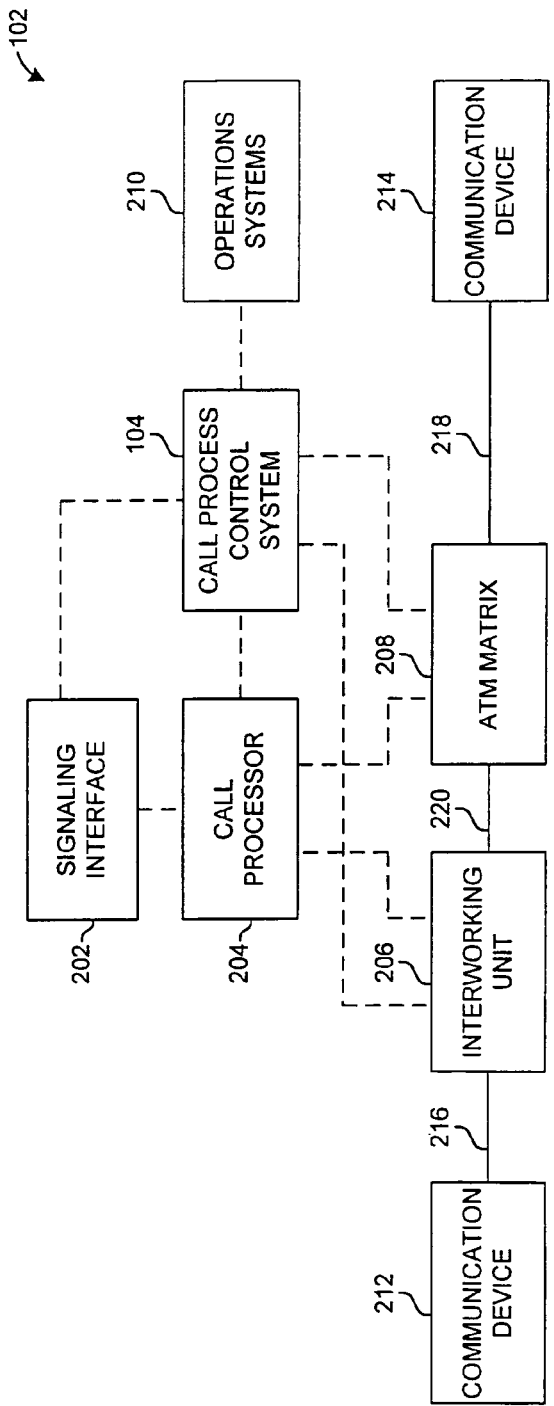
FIG. 2 is a block diagram of a call process control system with an expanded call signaling and call processing system in accordance with an embodiment of the present invention.

FIG. 2 illustrates an exemplary embodiment of a call processing system 102A of the present invention with an expanded call signaling and call processing system. The call processing system 102A of FIG. 2 comprises the CPCS 104 linked to a signaling interface 202, a call processor 204, an interworking unit 206, and an ATM matrix 208. In addition, an operations system 210 is linked to the CPCS 104. Moreover, a first communication device 212 and a second communication device 214 are connected through connections 216 and 218 to the interworking unit 206 and the ATM matrix 208, respectively. A connection 220 connects the interworking unit 206 and the ATM matrix 208.

The signaling interface 202 receives, processes, and transmits call signaling. The signaling interface 202 can obtain information from, and transmit information to, a communication device. Such information may be transferred, for example, as a TCAP message in queries or responses or as other SS7 messages such as an initial address message (IAM). The signaling interface 202 also passes information to the call processor 204 for processing and passes information from the call processor to other communication devices (not shown).

The call processor 204 is a signaling platform that can receive and process call signaling. The call processor 204 has data tables which have call connection data and which are used to process the call signaling. Based on the processed call signaling, the call processor 204 selects processing options, services, resources, or connections for the user communications. The call processor 204 generates and transmits control messages that identify the communication device, processing option, service, or resource that is to receive call signaling or that is be used in call connections or further call processing. The call processor 204 also selects virtual connections and circuit-based connections for routing of call signaling and connections for user communications and generates and transports control messages that identify the selected connections.

The call processor 204 transmits an enhanced circuit data block (ECDB) for each call process to the CPCS 104. The ECDB contains all of the information associated with the calls from the call signaling, including the call processor or switch, the calling number, the called number, the path, the equipment used to connect the calls, and echo canceller data. An example of the information in the ECDB is the information contained in the call processing tables explained below. The CPCS 104 combines the information in the ECDB with fixed attributes, such as a name associated with a trunk group number for example, to create a call information block (CIB).

The interworking unit 206 interworks traffic between various protocols. Preferably, the interworking unit 206 interworks between ATM traffic and non-ATM traffic, such as TDM traffic. The interworking unit 206 operates in accordance with control messages received from the call processor 204. These control messages typically are provided on a call-by-call basis and typically identify an assignment between a DS0 and a VP/VC for which user communications are interworked. In some instances, the interworking unit 206 may transport control messages which may include data to the call processor 204.

The ATM matrix 208 is a controllable ATM matrix that establishes connections in response to control messages received from the call processor 204. The ATM matrix 208 is able to interwork between ATM connections and TDM connections. The ATM matrix 208 also cross connects ATM connections with other ATM connections. In addition, the ATM matrix 208 can switch calls from TDM connections to other TDM connections. The ATM matrix 208 transmits and receives call signaling and user communications over the connections.

The operations system 210 transports translations for the call processing tables and other call-associated data to the CPCS 104. In addition, the operations system 210 accepts call-associated data from the CPCS 104. The operations system 210 comprises, for example, an alarm monitoring system that receives alarm data, and operations report system to receive trending data, an accounting system to receive accounting data, or a configuration system to transmit call processing translations or element configuration data to the CPCS 104. The operations system 210 may comprise other elements.

The communication devices 212 and 214 comprise customer premises equipment (CPE), a service platform, a switch, a remote digital terminal, a cross connect, an interworking unit, an ATM gateway, or any other device capable of inflating, handling, or terminating a call. CPE can be, for example, a telephone, a computer, a facsimile machine, or a private branch exchange. A service platform can be, for example, any enhanced computer platform that is capable of processing calls. A remote digital terminal is a device that concentrates analog twisted pairs from telephones and other like devices and converts the analog signals to a digital format known as GR-303. An ATM gateway is a device that changes ATM cell header VP/VC identifiers. The communication devices 212 and 214 may be TDM based or ATM based. In the system of FIG. 2, preferably the first communication device 212 is TDM based, and the second communication device 214 is ATM based.

The system of FIG. 2 operates as follows. Translations and other data are transported to the CPCS 104 from the operations system 210 and from other communications devices (not shown). In addition, the CPCS 104 transports data to the operations system 210 and the other communications devices, if required.

The CPCS 104 processes the translations data and organizes the data into tables that are identical to call processing tables that are located in the call processor 204. Then, the CPCS 104 data fills the call processing tables in the call processor 204. In addition, the CPCS 104 transports data to any device or entity to which it is configured to transport the data. This data fill may be completed at any time, and updates may be transported from the CPCS 104 to the call processor 204.

If any configuration of the signaling interface 202, the call processor 204, the interworking unit 206, or the ATM matrix 208 is required by the CPCS 104, that configuration information is transmitted to the appropriate element. In addition, alarms from the signaling interface 202, the call processor 204, the interworking unit 206, or the ATM matrix 208 are transmitted to the CPCS 104.

The first communication device 212 transmits call signaling to the signaling interface 202. The first communication device 212 transports the user communications to the interworking unit 206 over the connection 216.

The signaling interface 202 receives the call signaling and processes the call signaling to obtain call information elements. The signaling interface 202 passes the call information elements to the call processor 204.

The call processor 204 processes the call information elements to select connections 218 and 220 for the user communications. In this example, the selected connections 218 and 220 are each a VP/VC. However, in other examples, one or more of the selected connections may be a DS0 or other TDM connection.

The call processor 204 sends a first control message to the interworking unit 206 identifying the first selected connection 220 over which the user communications will be interworked. The call processor 204 sends a second control message to the ATM matrix 208 identifying the second selected connection 218 over which the user communications will be connected. In addition, the call processor 204 sends a setup ECDB to the CPCS 104.

The call processor 204 also sends call information elements to the signaling interface 202 destined for another communication device, for example, identifying the selected connection 218 over which the user communications are to be connected. The other communication device may be, for example, another call processor or a switch which may handle call signaling.

The signaling interface 202 receives the call information elements and processes them to obtain call signaling. In some instances, the control message is converted to an SS7 message The signaling interface 202 transports the call signaling to the destination communication device.

The interworking unit 206 receives the user communications from the first communication device 212 over the connection 216 and the first control message from the call processor 204. The interworking unit 206 interworks the user communications between the connection 216 and the connection 220 according to the first control message. In this example, the connection 216 is a TDM connection, such as a DS0.

The ATM matrix 208 receives the second control message from the call processor 204 and the user communications over the connection 220. The ATM matrix 208 connects the user communications to the connection 218 designated in the control message. The second communication device 214 receives the user communications over the connection 218.

When the call is completed, the call processor 204 transmits a terminating ECDB to the CPCS 104. The CPCS 104 configures the data in the ECDBs with fixed attribute data to form the CIBs. The CPCS 104 handles any additional alarm, configuration, or accounting function that was not handled during the call.

It will be appreciated that a call can be connected in the opposite direction from the ATM side to the TDM side. Also, a call can be switched from an ATM system to another ATM system or from a TDM system to another TDM system. It will be appreciated that the call processor or switch on the terminating side of the call also transmits ECDBs to the CPCS 104 during the call for setup and termination.

Figure 3:
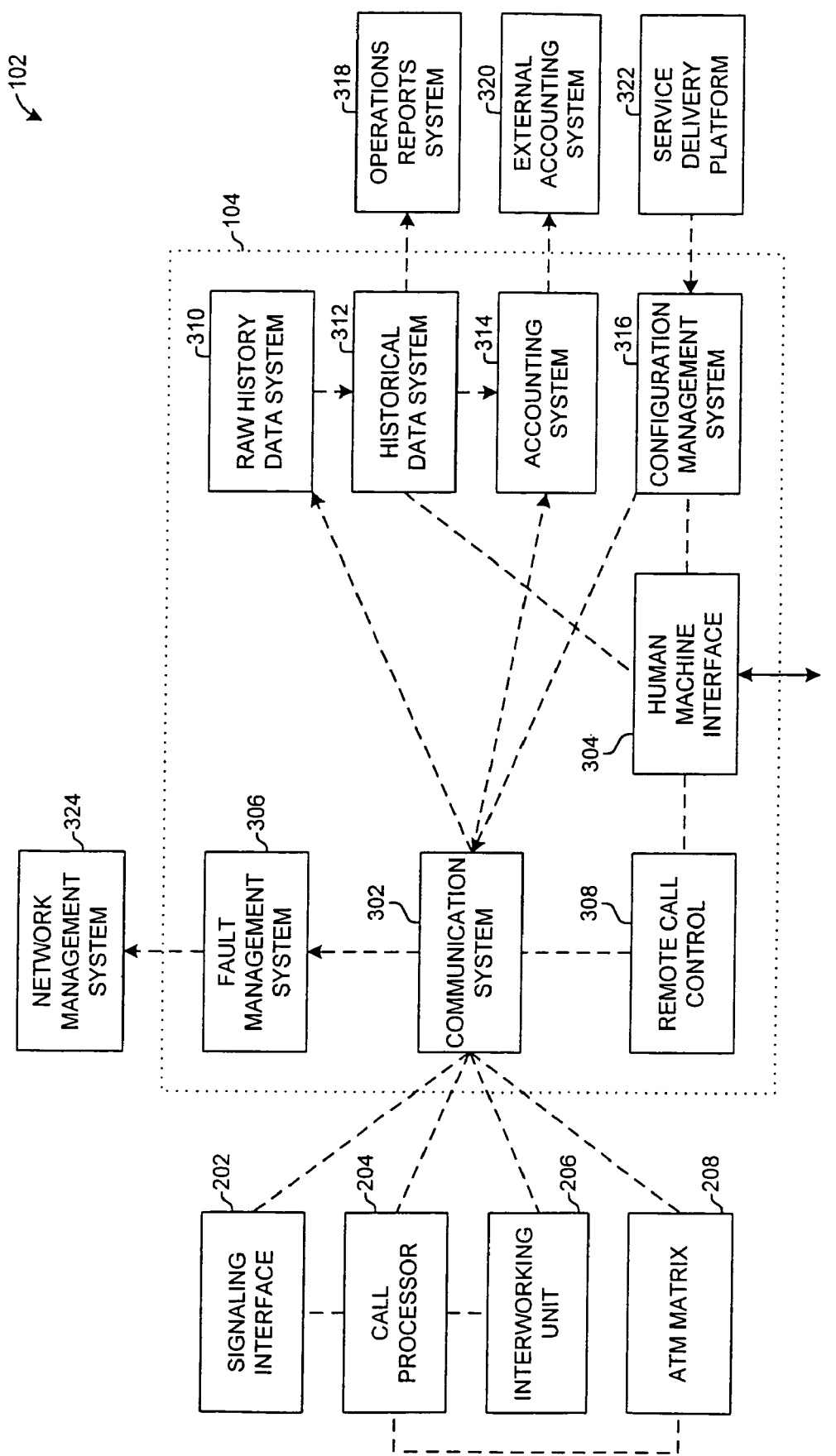
FIG. 3 is a block diagram of an expanded call process control system in accordance with an embodiment of the present invention.

FIG. 3 illustrates an exemplary embodiment of a CPCS of the present invention. In the embodiment of FIG. 3, the CPCS 104 contains a communication system 302, a human machine interface (HMI) 304, a fault management system 306, a remote call control (RCC) 308, a performance monitoring system, such as a raw history data system (RHDS) 310 and a historical data system 312, an accounting system 314, and a configuration management system (CMS) 316. The historical data system 312 is linked to an operations reports system 318, The accounting system 314 is linked to an external accounting system 320. The CMS 316 is linked to a service delivery platform (SDP) 322. The fault management system 306 is linked to a network management system 324.

The communication system 302 transfers control messages with data and other communications between the other elements of the CPCS 104 and an external device, such as the signaling processor, including in this example the signaling interface 202 and the call processor 204, the connection system, including in this example the interworking unit 206 and the ATM matrix 208, or another communications device. As used herein, an external device comprises a signaling processor, such as one or more of a signaling interface and a call processor, a connection system, such as one or more of an interworking unit and an ATM matrix, and a communications device, as described above, and other signaling processors or other connections systems. As used herein, a communication includes a control message.

The communication system 302 determines where the control messages are to be transmitted based upon the control message content and type and transmits them thereto. The communication system 302 is fault tolerant for reliability. An example of a messaging system standard that can be used as a basis for the communication system 302 is the common object request broker architecture (CORBA) 2.0 specification standard developed by Object Management Group, Inc. (OMG, Inc.).

The HMI 304 allows a person to log onto the CPCS 104 and to manage data tables, such as the call processing tables, to review data tables in the CPCS, or to provide other maintenance services. Thus, the HMI 304 allows access to the CPCS 104 for active call processing management and passive call processing management.

The fault management system 306 manages alarm data, fault data, and other performance data from the signaling interface 202, the call processor 204, the interworking unit 206, and the ATM matrix 208. Initially, the signaling interface 202, the interworking unit 206, and the ATM matrix 208 report the performance data to the call processor 204 so that the processing tables can be updated. The call processor 204 then forwards the performance data to the CPCS 104, and the fault management system 306 configures the data in a reportable format. The fault management system 306 insures that the CPCS 104 broadcasts the alarm, fault, and other performance data to the required support systems, such as the network management system 324. Parameters for the required broadcast systems are configurable based upon an individual fault or alarm number or classification.

The RCC 308 is an autonomous management system that is used to provide services for active calls and completed calls. The RCC 308 active call services and completed call services functionality each includes call tracing, call tapping, call verification and queries, fraud detection, call testing, and call control management using, for example, skipping and gapping of calls.

The RCC 308 processes call information for calls that are in a persistent/active state. For example, when a call goes off-hook, the call processor 204 sends a setup ECDB to the CPCS 104 which contains the off-hook information as well as other call information about the call. When the call goes on-hook, a terminating ECDB is sent from the call processor 204 to the CPCS 104. The CPCS 104 has a list of active calls and a list of circuits that are busy. The RCC 308 uses this information to determine how busy the call processor 204 is and to provide other call control management services. Because this ECDB processing takes place by the RCC 308 in the CPCS 104, processing time and space are not wasted in the call processor 204.

The RHDS 310 receives and stores the raw history for logs, alarms, and operational measurements (OMs). The data is generated for five minute intervals. The RHDS 310 transfers the data to the historical data system 312 for processing.

The historical data system 312 provides decisional support for the raw history data which is stored in the RHDS 310. The historical data system 312 receives data from the RHDS 310, extracts subsets of log data, alarm data, and OM data, and formats it to usable events and OM measures for reporting to external systems, such as the operations reports system 318, and for viewing.

The accounting system 314 processes the ECDBs with fixed attribute data to form the CIBs and uses the ECDBs and the CIBs to develop call detail records (CDRs). The accounting system 314 combines the CIBs to form the CDRs and then transmits the CDRs to the external accounting system 320.

The accounting system 314 accounting algorithms are based upon the call signaling on an individual call by call basis. The actual call history is reviewed and billing and other accounting applications are based on the actual route and connections processed for the call This avoids user data entry errors and translations data fill errors that would impact accounting applications.

The CMS 316 is used to configure all elements of the call processing system, including the signaling interface 202, the call processor 204, the interworking unit 206, and the ATM matrix 208. The CMS 316 allows a user to define customer routing through the call processing tables.

The operations reports system 318 receives OM measures and other reporting data from the CPCS 104. The operations reports system 318 then forwards the reported data to appropriate centers for compilation and/or distribution.

The external accounting system 320 receives accounting information, such as CDRs, from the CPCS 104. The external accounting system 320 may compile the data and forward it to appropriate centers for processing and distribution. An example of an accounting system is an enterprise system such as a merged call processor (MCP) system.

The SDP 322 provides product and service data to the CPCS 104. The SDP 322 collects information from operations centers, such as field maintenance systems, customer information systems, and other service order entry platforms and forwards the data to the CPCS 104. The data provided to the CPCS 104 by the SDP 322 includes translations used to data fill the call processing tables and other network configuration data.

The network management system 324 manages the fault data and the other performance data for the network. The network management system 324 is linked to other management systems and interfaces for other networks so that performance data may be exchanged.

FIG. 4 illustrates an exemplary embodiment of a fault management system 306 of the present invention. The fault management system 306 of FIG. 4 has a CPCS site reporting control 402 with a site recovery database 404, a CPCS craft control 406 with a site equipment inventory database 408, a site craft control 410, and a regional craft control 412 with a CPCS equipment inventory database 414.

The CPCS site reporting control 402 controls which call processor or switch reports reporting data, such as configuration data, call processing data, and other data, to a designated CPCS site. This control is user configurable to allow for disaster planning if a CPCS site is lost. The site recovery database 404 contains the data identifying which call processor or switch reports to the designated CPCS.

The CPCS craft control 406 provides the status and equipment inventory of a CPCS site. If a hardware element at the CPCS site fails, it will be viewable from the CPCS craft control 406. The site equipment inventory database 408 contains the data identifying the site equipment inventory and status.

The site craft control 410 provides a graphical interface for viewing and control of call processor alarms. The site craft control 410 is integrated with call processing applications alarms and other equipment alarms via management information bases (MIBs) to allow operators of the system to have one common view. Each call processor or switch is responsible for transmitting the MIBs to the CPCS 104.

The regional craft view 412 provides multiple operations centers views to multiple call processor or switch sites. When an operations center focuses on an individual site, they can view the same data and user interface screens as call processor or switch site operators. The CPCS equipment inventory database 414 contains the data identifying the call processor or switch sites' equipment inventory and status.

FIG. 5 illustrates an exemplary embodiment of an RCC 308 of the present invention. The RCC 308 of FIG. 5 has a call trace system 502 with a user authorize database 504, a call tap system 506 with a call tap delivery database 508, an active call query system 510 with an active call file database 512, a fraud detection system 514 with a connect deny database 516, a test call system 518 with a traffic management history database 520, and a skip & gap system 522. The call trace system 502, the call tap system 506, the fraud detection system 514, and the test call system 518 also can access the active call file database 512.

The call trace system 502 can trace a call from a centralized location, such as the call processor or switch site, while the call is active and in progress. The call trace system 502 uses information from a central computer file in a CPCS 104 for the call trace. Typically, the call trace system 502 accesses the active call file database 512 to obtain the call trace information for an active call. In addition, the call trace system 502 can trace a call for completed calls. The completed call trace function is implemented by accessing the historical records.

The call trace system 502 verifies the data for the call processing tables directly at the call processor 204 to ensure that the call processor and the CPCS 104 are synchronized.

(See FIG. 3.) For example, in a first function the call trace system 502 can traverse the call processing tables in the CPCS 104 based on data input by an operator. In another function a selected set of parameters determines if the call processor 204 and the CPCS 104 are synchronized. Automated routines ensure that synchronization and any out of synchronization conditions are reported as an alarm. In a third function the CIB data can be retrieved for review of SS7 routing information, the interworking unit connection information, the ATM matrix connection information, and other data that is used to determine quality of service on historical calls.

The user authorize database 504 contains information for providing security and secure access to the RCC 308 and its sub-systems. The information in the user authorize database 504 identifies operators that can trace calls. This function and information make the call trace system 502 and its functions highly secure.

The call tap system 506 taps calls that are active in progress. The call tap system 506 can tap every call to or from a location. The call tap system 506 is configured to tap the calls from a centralized location, such as from the call processor or switch site. The call tap delivery database 508 contains warrant preset information that allows an operator or function to tap a call.

The active call query system 510 finds particular calls that are active. The active call query system 510 searches calls that are in progress and obtains details about the call. The active call query system 510 can be used, for example, for call maintenance, such as to fix a call or to check the quality of the call, and for law enforcement requirements, such as call tap and call trace. The active call query system 510 can be used from a centralized location, such as a call processor or switch site. For example, a desktop computer may be used to employ the active call query system 510 on a network wide basis.

The active call file database 512 contains the history of all the calls, including the call processor or switch, the calling number, the called number, the path, the equipment used to connect the calls, and echo canceller data. For example, the CIB file contains the exact number of the echo canceller for the call, if used, the exact connections, and the exact signaling links used. Therefore, by querying the active call file database 512, a specific call can be determined and the exact information for the call examined to determine loss of quality or other concerns for calls. This function is a significant advance over prior systems that are manual and employ a hit or miss strategy.

The fraud detection system 514 uses data from active calls to determine fraudulent callers. The fraud detection system 514 may force a release of the calls while the calls are active. This is an improvement over the art since prior systems require a call to go on-hook before taking an action. The connect deny database 516 contains records of which connections are to be denied. The records of the connections can be based on automatic number identification (ANI).

The test call system 518 can test calls from locations remote from the current call connection to determine if the quality of the connection is acceptable. For example, the test call system 518 allows the CPCS 104 to test calls at locations that are remote from the CPCS or the call processor 204. The test call system 518 provides physical route verification for calls by locating the CIB of a call that has a poor quality. Because the CIB has data associated with the physical path, the physical path can be verified. The traffic manage history database 520 contains data related to the test history of the call. The results of test calls, including links to the CIB file and the call signaling, are stored in the traffic manage history database 520.

The skip and gap system 522 uses call throttling features to ensure that the ATM and TDM connections and the call signaling links at the call processor or switch site are not overloaded. The skip and gap system 522 use call control features, such as dropping calls and dropping events, to control traffic.

Figure 6:
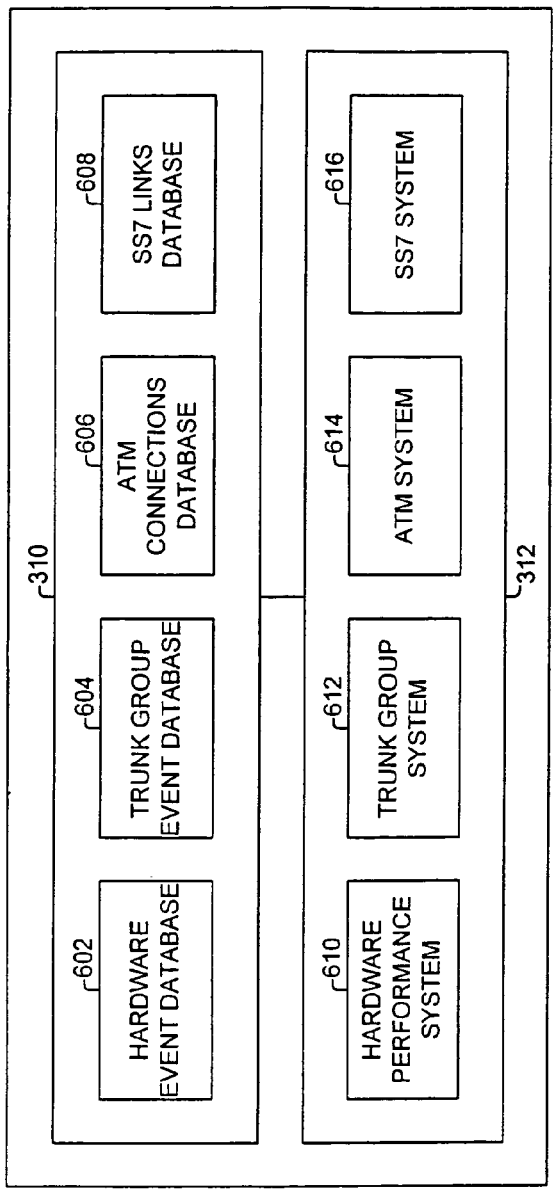
FIG. 6 is a block diagram of a historical data processing system with an operational measurements system in accordance with an embodiment of the present invention.

FIG. 6 illustrates an exemplary embodiment of a performance monitoring system which includes an RHDS 310 and a historical data system 312 of the present invention. In the embodiment of FIG. 6, the RHDS 310 and the historical data system 312 operate in conjunction with each other.

The RHDS 310 has a hardware event database 602, a trunk group event database 604, an ATM connections database 606, and an SS7 links database 608. The historical data system 312 has historical information on a hardware performance system 610, a trunk group system 612, an ATM system 614, and an SS7 system 616.

The hardware performance system 610 processes hardware performance data such as logs, alarms, and OMs received from the elements of the call processing system 102, including the signaling interface 202, the call processor 204, the interworking unit 206, and the ATM matrix 208 (see FIG. 3). The hardware performance data is taken every fifteen minutes and is stored in the hardware event database 602. The hardware performance system 610 implements the hardware measures as defined for computing platforms.

The hardware performance system 610 analyzes the hardware performance data to determine operational patterns and to provide causal analysis for prediction of fault, equipment failure, and other forecasts. For example, a single cause code, data for a call processor or switch site, or a specified detail can be reviewed. In addition, an operator can view the data in different configurations, such as organized by cause code, call processor or switch, or trunk, and at different levels of specificity, such as different increments of time. Because the hardware performance data is stored in the hardware event database 602 in a three-dimensional array, an operator can zoom in or zoom out while viewing the data. For example, data can be viewed by month, day, hour, or five minute increments. Also, the hardware performance system 610 summarizes the history at a specified level, such as a five minute increment, for trending analysis. Analysis can be provided for a five minute history level.

The trunk group system 612 processes informational data such as logs, alarms, and OMs received for all trunk groups. The trunk group data is taken and is stored in the trunk group database 604. The trunk group system 612 analyzes the trunk group data to determine operational patterns and to provide causal analysis for prediction of fault, equipment failure, and other forecasts. For example, a single cause code, data for a call processor or switch site, or a specified detail can be reviewed. In addition, an operator can view the data in different configurations, such as organized by cause code, call processor or switch, or trunk, and at different levels of specificity, such as different increments of time. Because the trunk group data is stored in the trunk group event database 604 in a three-dimensional array, an operator can zoom in or zoom out while viewing the data. For example, data can be viewed by month, day, hour, or five minute increments. Also, the trunk group system 612 summarizes the history at a specified level, such as a five minute increment, for trending analysis. Analysis can be provided for a five minute history level.

The ATM system 614 processes informational data such as logs, alarms, and OMs received for all ATM connections. The ATM connection data is taken and is stored in the ATM connections database 606. The ATM system 614 analyzes the ATM connection data to determine operational patterns and to provide causal analysis for prediction of fault, equipment failure, and other forecasts. For example, a single cause code, data for a call processor or switch site, or a specified detail can be reviewed. In addition, an operator can view the data in different configurations, such as organized by cause code, call processor or switch, or trunk, and at different levels of specificity, such as different increments of time. Because the ATM connection data is stored in the ATM connections database 606 in a three-dimensional array, an operator can zoom in or zoom out while viewing the data. For example, data can be viewed by month, day, hour, or five minute increments. Also, the ATM system 614 summarizes the history at a specified level, such as a five minute increment, for trending analysis. Analysis can be provided for a five minute history level.

The SS7 system 616 processes informational data such as logs, alarms, and OMs received for all SS7 links, such as for measures of link utilization and the type of messaging that occurs for the message transfer part (MTP) layers and the signaling connection control part (SCCP) layers. The SS7 link data is taken and is stored in the SS7 links database 608. The SS7 system 616 analyzes the SS7 link data to determine operational patterns and to provide causal analysis for prediction of fault, equipment failure, and other forecasts. For example, a single cause code, data for a call processor or switch site, or a specified detail can be reviewed.

In addition, an operator can view the data in different configurations, such as organized by cause code, call processor or switch, or trunk, and at different levels of specificity, such as different increments of time. Because the SS7 links data is stored in the SS7 links database 608 in a three-dimensional array, an operator can zoom in or zoom out while viewing the data. For example, data can be viewed by month, day, hour, or fifteen minute increments. Also, the SS7 system 616 summarizes the history at a specified level, such as a fifteen minute increment, for trending analysis. Analysis can be provided for a five minute history level.

Figure 7:
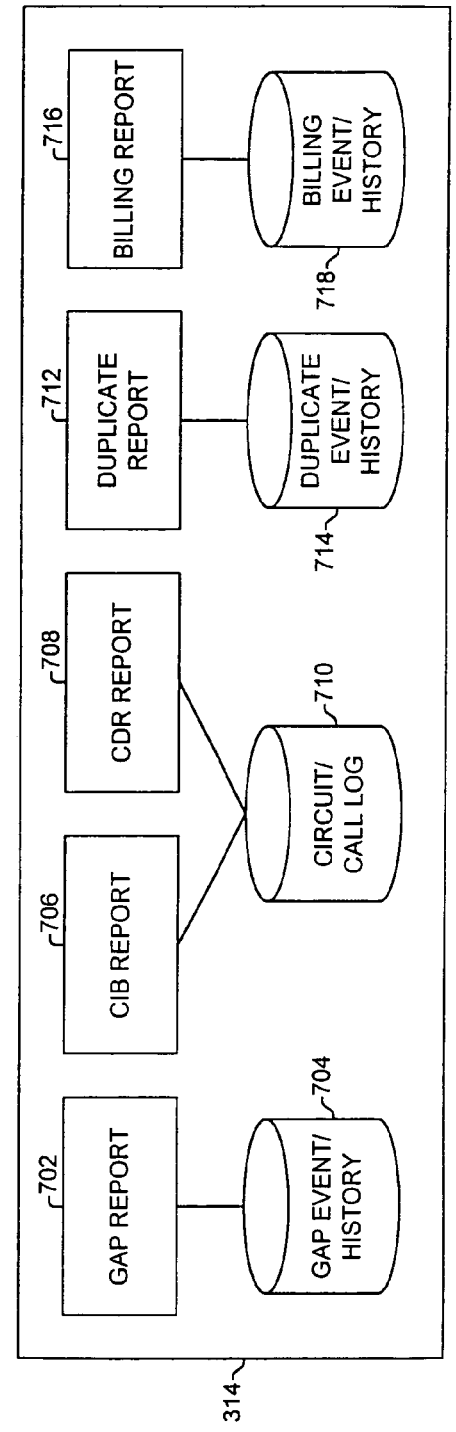
FIG. 7 is a block diagram of an accounting control system in accordance with an embodiment of the present invention.

FIG. 7 illustrates an exemplary embodiment of an accounting system 314 of the present invention. The accounting system 314 of FIG. 7 has a gap report system 702 with a gap event/history database 704, a CIB report system 706 and a CDR report system 708 which have a circuit/call log database 710, a duplicate report system 712 with a duplicate event/history database 714, and a billing report system 716 with a billing event/history database 718.

The gap report system 702 processes the gap event history contained in the gap event/history database 704 so that it can be viewed in a graphical output or in a report. Each call processor or switch uniquely identifies an ECDB which then is transmitted by the call processor or switch to the CPCS 104. If the gap report system 702 detects a break in the sequence on the ECDB sequence number, it will be recorded in the gap event/history database 704. The gap report system 702 will initiate a process so that the CPCS 104 will automatically attempt to recover the lost ECDB record.

The CIB report system 706 processes the CIBs that are stored in the circuit/call log database 710 to determine the number of each CIB record type that was converted from ECDBs that were received from a call processor or switch. The CIB data is processed on a call processor or switch basis and on a fifteen minute basis.

The CDR report system 708 processes the CDRs that are stored in the circuit/call log database 710 to determine the number of each CIB record type that was translated into a billable CDR. The CDR data is processed on a call processor or switch basis and on a per hour basis.

The duplicate report system 712 processes the ECDBs stored in the duplicate event/history 714 to determine if a duplicate record was generated by a call processor or switch. The duplicate record is determined based on the ECDB sequence number, the time points, and other pertinent data in the ECDB. If a duplicate record is found, it is recorded by the duplicate report system 712, and a report is generated. Duplicate records are recorded in the duplicate event/history database 714.

The billing report system 716 processes the ECDBs/CIBs/CDRs to keep a historical record of billing events, such as the length of the call, the time of day for the call, the called party, and others. Events such as external accounting system unavailable, wide area network devices unavailable, and switch clock changes, are recorded in this record. The records are recorded in the billing event/history database 718.

Figure 8:
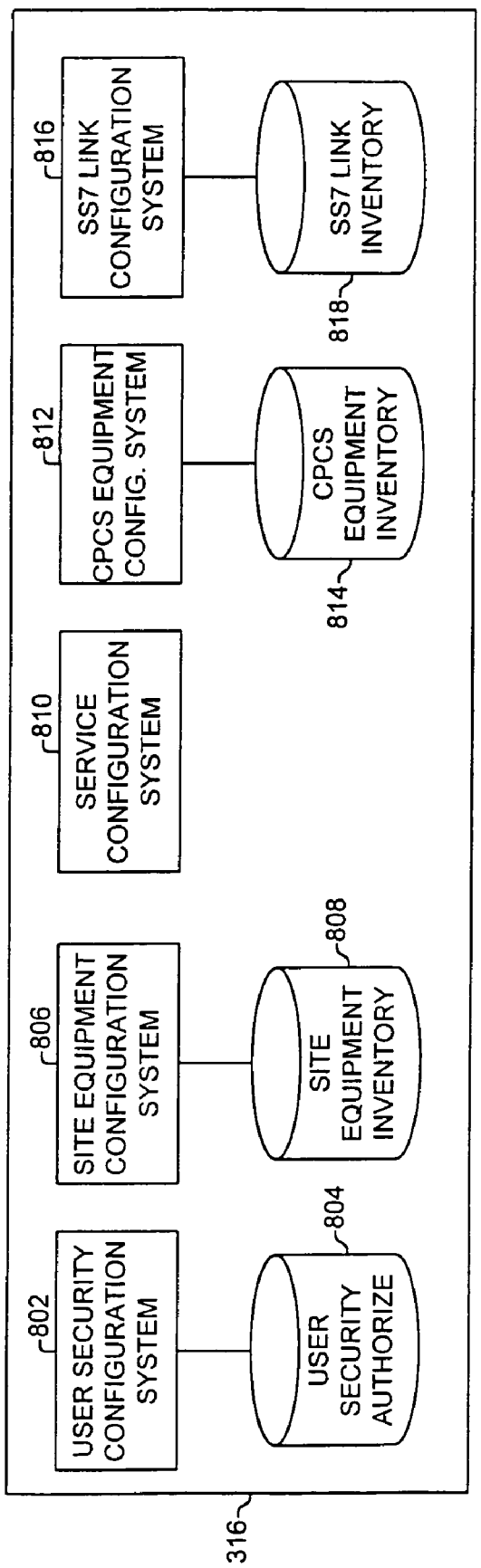
FIG. 8 is a block diagram of a configuration management system in accordance with an embodiment of the present invention.

FIG. 8 illustrates an exemplary embodiment of the CMS 316 of the present invention. The CMS 316 of FIG. 8 has a user security configuration system 802 with a user security/authorize database 804, a site equipment configuration system 806 with a site equipment inventory database 808, a service configuration system 810, a CPCS equipment configuration system 812 with a CPCS equipment inventory database 814, and an SS7 link configuration system 816 with an SS7 link inventory database 818.

The user security configuration system 802 is a CPCS centrally controlled user security system. The user security configuration system 802 provides operators the ability to define objects in the telephony networks that can be managed by simple network management protocol (SNMP) or common management information protocol (CMIP) and that can implement user security at the object level. Although CMIP provides a level of security that SNMP is not able to provide, some objects do not require the higher level of security available through CMIP objects. Thus, both CMIP objects and SNMP objects may be used.

In one example, the system could be configured so that the call processing tables are defined as a telephony managed network managed object, and only selected operators would be given the capacity to update them. However, other non-selected operators would be able to only view the call processing tables. The user security configuration data is stored in the user security/authorize database 804.

The site equipment configuration system 806 processes the MIBs to determine the hardware configurations of the call processor or switch site, including the signaling interface 202, the call processor 204, the interworking unit 206, and the ATM matrix 208 (see FIG. 3). The hardware configuration data is stored in the site equipment inventory database 808, and it is viewable from the CPCS 104 for authorized users (see FIG. 3).

The service configuration system 810 allows authorized users a mechanism to view and update the call processing tables. The service configuration system 810 maintains an image file for updates made to the call processing tables at the CPCS 104. The service configuration system 810 allows external accounting systems 320 and legacy systems to retrieve the image data.

The CPCS equipment configuration system 812 processes MIBs to determine the versions of the hardware and software installed in the call processor or switch site, including those for the signaling interface 202, the call processor 204, the interworking unit 206, and the ATM matrix 208 (see FIG. 3). The hardware and software version data is stored in the CPCS equipment inventory database 814, and it is viewable from the CPCS 104 for authorized users (see FIG. 3).

The SS7 link configuration system 816 processes MIBs to determine the configuration of the SS7 links extending to and from the call processor or switch site. The SS7 link data is stored in the SS7 link inventory database 818, and it is viewable from the CPCS 104 for authorized users (see FIG. 3).

The Controllable ATM Matrix

Figure 9:
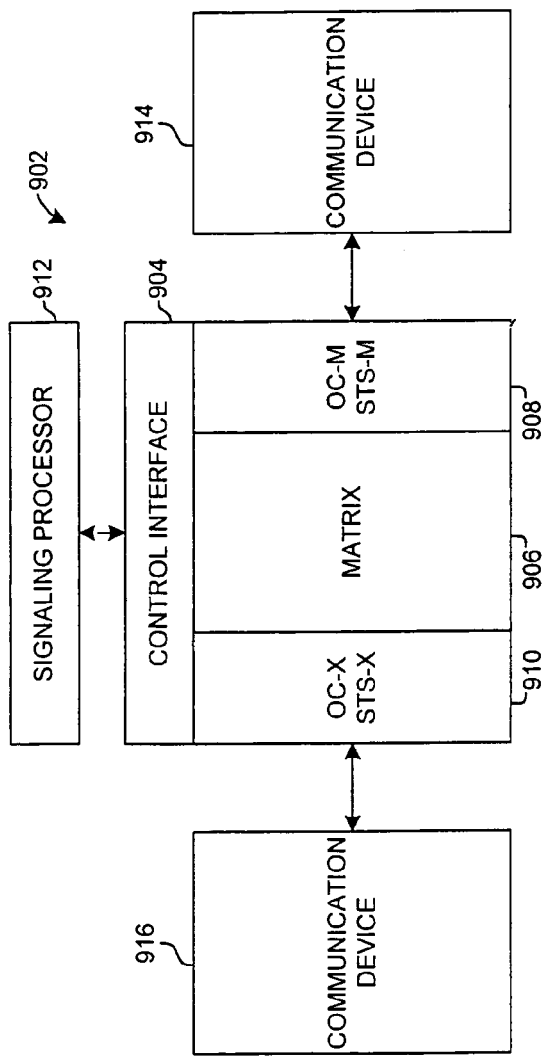
FIG. 9 is a functional diagram of a controllable asynchronous transfer mode matrix in accordance with the present invention.

FIG. 9 illustrates an exemplary embodiment of a controllable asynchronous transfer mode, (ATM) matrix (CAM), but other CAMs that support the requirements of the invention also are applicable. The CAM 902 may receive and transmit ATM formatted user communications or call signaling.

The CAM 902 preferably has a control interface 904, a controllable ATM matrix 906, an optical carrier-M/synchronous transport signal-M (OC-M/STS-M) interface 908, and an OC-X/STS-X interface 910. As used herein in conjunction with OC or STS, "M" refers to an integer, and "X" refers to an integer.

The control interface 904 receives control messages originating from the signaling processor 912, identifies virtual connection assignments in the control messages, and provides these assignments to the matrix 906 for implementation. The control messages may be received over an ATM virtual connection and through either the OC-M/STS-M interface 908 or the OC-X/STS-X interface 910 through the matrix 906 to the control interface 904, through either the OC-M/STS-M interface or the OC-X/STS-X interface directly to the control interface, or through the control interface from a link.

The matrix 906 is a controllable ATM matrix that provides cross connect functionality in response to control messages from the signaling processor 912. The matrix 906 has access to virtual path/virtual channels (VP/VCs) over which it can connect calls. For example, a call can come in over a VP/VC through the OC-M/STS-M interface 908 and be connected through the matrix 906 over a VP/VC through the OC-X/STS-X interface 910 in response to a control message received, by the signaling processor 912 through the control interface 904. Alternately, a call can be connected in the opposite direction. In addition, the call can be received over a VP/VC through the OC-M/STS-M interface 908 or the OC-X/STS-X interface 910 and be connected through the matrix 906 to a different VP/VC on the same OC-MSTS-M interface or the same OC-X/STS-X.

The OC-M/STS-M interface 908 is operational to receive ATM cells from the matrix 906 and to transmit the ATM cells over a connection to the communication device 914. The OC-M/STS-M interface 908 also may receive ATM cells in the OC or STS format and transmit them to the matrix 906.

The OC-X/STS-X interface 910 is operational to receive ATM cells from the matrix 906 and to transmit the ATM cells over a connection to the communication device 916. The OC-X/STS-X interface 910 also may receive ATM cells in the OC or STS format and transmit them to the matrix 906.

Call signaling may be received through and transferred from the OC-M/STS-M interface 908. Also, call signaling may be received through and transferred from the OC-X/STS-X interface 910. The call signaling may be connected on a connection or transmitted to the control interface directly or via the matrix 906.

The signaling processor 912 is configured to send control messages to the CAM 902 to implement particular features on particular VP/VC circuits. Alternatively, lookup tables may be used to implement particular features for particular VP/VCs.

Figure 10:
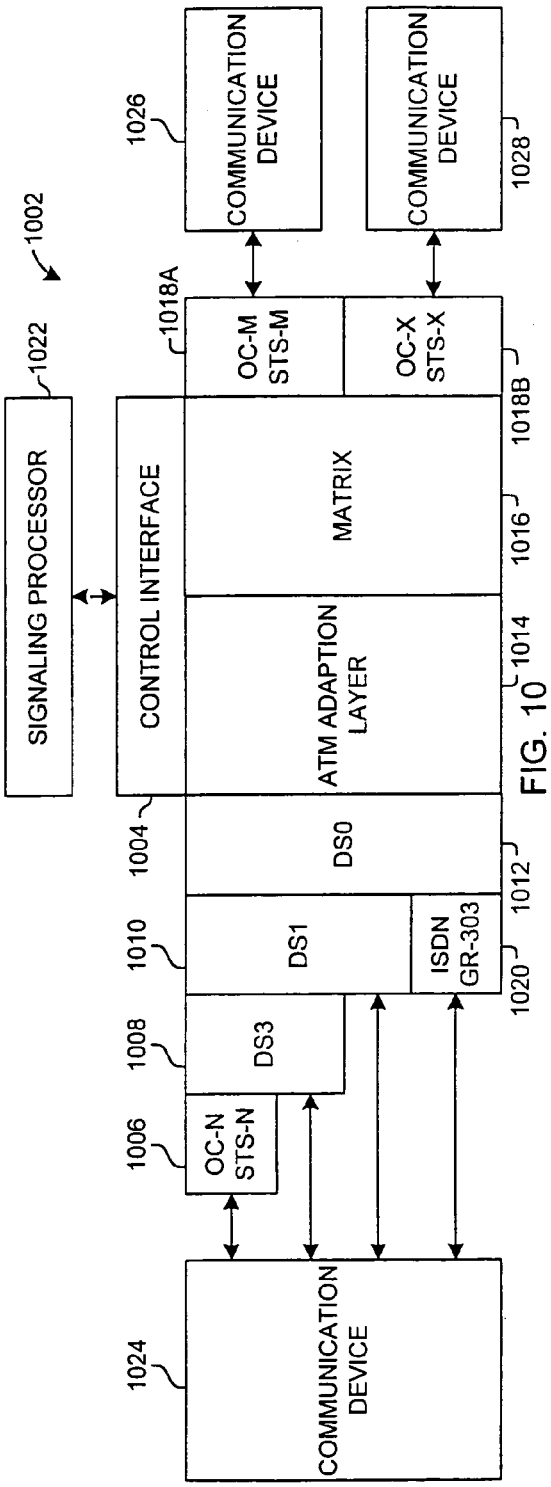
FIG. 10 is a functional diagram of a controllable asynchronous transfer mode matrix with time division multiplex capability in accordance with the present invention.

FIG. 10 illustrates another exemplary embodiment of a CAM which has time division multiplex (TDM) capability, but other CAMs that support the requirements of the invention also are applicable. The CAM 1002 may receive and transmit in-band and out-of-band signaled calls.

The CAM 1002 preferably has a control interface 1004, an OC-N/STS-N interface 1006, a digital signal level 3 (DS3) interface 1008, a DS1 interface 1010, a DS0 interface 1012, an ATM adaptation layer (AAL) 1014, a controllable ATM matrix 1016, an OC-M/STS-M interface 1018A, an OC-X/STS-X interface 1018B, and an ISDN/GR-303 interface 1020. As used herein in conjunction with OC or STS, "N" refers to an integer, "M" refers to an integer, and "X" refers to an integer.

The control interface 1004 receives control messages originating from the signaling processor 1022, identifies DS0 and virtual connection assignments in the control messages, and provides these assignments to the AAL 1014 or the matrix 1016 for implementation. The control messages may be received over an ATM virtual connection and through the OC-M/STS-M interface 1018A to the control interface 1004, through the OC-X/STS-X interface 1018B and the matrix 1016 to the control interface, or directly through the control interface from a link.

The OC-N/STS-N interface 1006, the DS3 interface 1008, the DS1 interface 1010, the DS0 interface 1012, and the ISDN/GR-303 interface 1020 each can receive user communications from a communication device 1024. Likewise, the OC-M/STS-M interface 1018A and the OC-X/STS-X interface 1018B can receive user communications from the communication devices 1026 and 1028.

The OC-N/STS-N interface 1006 receives OC-N formatted user communications and STS-N formatted user communications and converts the user communications to the DS3 format. The DS3 interface 1008 receives user communications in the DS3 format and converts the user communications to the DS1 format. The DS3 interface 1008 can receive DS3s from the OC-N/STS-N interface 1006 or from an external connection. The DS1 interface 1010 receives the user communications in the DS1 format and converts the user communications to the DS0 format. The DS1 interface 1010 receives DS1s from the DS3 interface 1008 or from an external connection. The DS0 interface 1012 receives user communications in the DS0 format and provides an interface to the AAL 1014. The ISDN/GR-303 interface 1020 receives user communications in either the ISDN format or the GR-303 format and converts the user communications to the DS0 format. In addition, each interface may transmit user communications in like manner to the communication device 1024.

The OC-N/STS-M interface 1018A is operational to receive ATM cells from the AAL 1014 or from the matrix 1016 and to transmit the ATM cells over a connection to the communication device 1026. The OC-M/STS-M interface 1018A also may receive ATM cells in the OC or STS format and transmit them to the AAL 1014 or to the matrix 1016.

The OC-X/STS-X interface 1018B is operational to receive ATM cells from the A-AL 1014 or from the matrix 1016 and to transmit the ATM cells over a connection to the communication device 1028. The OC-XSTS-X interface 1018B also may receive ATM cells in the OC or STS format and transmit them to the AAL 1014 or to the matrix 1016.

Call signaling may be received through and transferred from the OC-N/STS-N interface 1006 and the ISDN/GR-303 interface 1020. Also, call signaling may be received through and transferred from the OC-MSTS-M interface 1018A and the OC-X/STS-X interface 1018B. The call signaling may be connected on a connection or transmitted to the control interface directly or via an interface as explained above.

The AAL 1014 comprises both a convergence sublayer and a segmentation and reassembly (SAR) sublayer. The AAL 1014 obtains the identity of the DS0 and the ATM VP/VC from the control interface 1004. The AAL 1014 is operational to convert between the DS0 format and the ATM format. AALs are known in the art, and information about AALs is provided by International Telecommunications Union (ITU) documents in the series of 1.363, which are incorporated herein by reference. For example, ITU document 1.363.1 discusses AAL1. An AAL for voice calls is described in U.S. Pat. No. 5,806,553 entitled "Cell Processing for Voice Transmission," which is incorporated herein by reference.

Calls with multiple 64 Kilo-bits per second (Kbps) DS0s are known as N×64 calls. If desired, the AAL 1014 can be configured to accept control messages through the control interface 1004 for N×64 calls. The CAM 1002 is able to interwork, multiplex, and demultiplex for multiple DS0s. A technique for processing VP/VCs is disclosed in U.S. patent application Ser. No. 08/653,852, which was filed on May 28, 1996, and entitled "Telecommunications System with a Connection Processing System," and which is incorporated herein by reference.

DS0 connections are bi-directional and ATM connections are typically uni-directional. As a result, two virtual connections in opposing directions typically will be required for each DS0. Those skilled in the art will appreciate how this can be accomplished in the context of the invention. For example, the cross-connect can be provisioned with a second set of VP/VCs in the opposite direction as the original set of VP/VCs.

The matrix 1016 is a controllable ATM matrix that provides cross connect functionality in response to control messages from the signaling processor 1022. The matrix 1016 has access to VP/VCs over which it can connect calls. For example, a call can come in over a VP/VC through the OC-M/STS-M interface 1018A and be connected through the matrix 1016 over a VP/VC through the OC-X/STS-X interface 1018B in response to a control message received by the signaling processor 1022 through the control interface 1004. Alternately, the matrix 1016 may transmit a call received over a VP/VC through the OC-M/STS-M interface 1018A to the AAL 1014 in response to a control message received by the signaling processor 1022 through the control interface 1004. Communications also may occur in opposite directions through the various interfaces.

In some embodiments, it may be desirable to incorporate digital signal processing capabilities at, for example, the DS0 level. It also may be desired to apply echo control to selected DS0 circuits. In these embodiments, a signal processor may be included. The signaling processor 1022 is configured to send control messages to the CAM 1002 to implement particular features on particular DS0 or VP/VC circuits. Alternatively, lookup tables may be used to implement particular features for particular circuits or VP/VCs.

It will be appreciated from the teachings above for the CAMs and for the teachings below for the ATM interworking units, that the above described CAMs can be adapted for modification to transmit and receive other formatted communications such as synchronous transport module (STM) and European level (E) communications. For example, the OC/STS, DS3, DS1, DS0, and ISDN/GR-303 interfaces can be replaced by STM electrical/optical (E/O), E3, E1, E0, and digital private network signaling system (DPNSS) interfaces, respectively.

The ATM Interworking Unit

FIG. 11 illustrates an exemplary embodiment of an interworking unit which is an ATM interworking unit 1102 suitable for the present invention for use with a SONET system. Other interworking units that support the requirements of the invention also are applicable. The ATM interworking unit 1102 may receive and transmit in-band and out-of-band calls.

The ATM interworking unit 1102 preferably has a control interface 1104, an OC-N/STS-N interface 1106, a DS3 interface 1108, a DS1 interface 1110, a DS0 interface 1112, a signal processor 1114, an AAL 1116, an OC-M/STS-M interface 1118, and an ISDN/GR-303 interface 1120. As used herein in conjunction with OC or STS, "N" refers to an integer, and "M" refers to an integer.

The control interface 1104 receives control messages originating from the signaling processor 1122, identifies DS0 and virtual connection assignments in the control messages, and provides these assignments to the AAL 1116 for implementation. The control messages are received over an ATM virtual connection and through the OC-M/STS-M interface 1118 to the control interface 1104 or directly~through the control interface from a link.

The OC-N/STS-N interface 1106, the DS3 interface 1108, the DSI interface 1110, the DS0 interface 1112, and the ISDN/GR-303 interface 1120 each can receive user communications from a communication device 1124. Likewise, the OC-M/STS-M interface 1118 can receive user communications from a communication device 1126.

The OC-N/STS-N interface 1106 receives OC-N formatted user communications and STS-N formatted user communications mad demultiplexes the user communications to the DS3 format. The DS3 interface 1108 receives user communications in the DS3 format and demultiplexes the user communications to the DS1 format. The DS3 interface 1108 can receive DS3s from the OC-N/STS-N interface 1106 or from an external connection. The DS1 interface 1110 receives the user communications in the DS1 format and demultiplexes the user communications to the DS0 format. The DS1 interface 1110 receives DS1s from the DS3 interface 1108 or from an external connection. The DS0 interface 1112 receives user communications in the DS0 format and provides an interface to the AAL 1116. The ISDN/GR-303 interface 1120 receives user communications in either the ISDN format or the GR-303 format and converts the user communications to the DS0 format. In addition, each interface may transmit user communications in like manner to the communication device 1124.

The OC-M/STS-M interface 1118 is operational to receive ATM cells from the AAL 1116 and to transmit the ATM cells over the connection to the communication device 1126. The OC-M/STS-M interface 1118 also may receive ATM cells in the OC or STS format and transmit them to the AAL 1116.

Call signaling may be received through and transferred from the OC-N/STS-N interface 1106 and the ISDN/GR-303 interface 1120. Also, call signaling may be received through and transferred from the OC-M/STS-M interface 1118. The call signaling may be connected on a connection or transmitted to the control interface directly or via another interface as explained above.

The AAL 1116 comprises both a convergence sublayer and a segmentation and reassembly (SAR) sublayer. The AAL 1116 obtains the identity of the DS0 and the ATM VP/VC from the control interface 1104. The AAL 1116 is operational to convert between the DS0 format and the ATM format.

If desired, the AAL 1116 can be configured to accept control messages through the control interface 1104 for N×64 calls. The ATM interworking unit 1102 is able to interwork, multiplex, and demultiplex for multiple DS0s.

DS0 connections are bi-directional and ATM connections are typically uni-directional. As a result, two virtual connections in opposing directions typically will be required for each DS0. Those skilled in the art will appreciate how this can be accomplished in the context of the invention. For example, the cross-connect can be provisioned with a second set of VP/VC in the opposite direction as the original set of VP/VCs.

In some embodiments, it may be desirable to incorporate digital signal processing capabilities at the DS0 level. It may also be desired to apply echo control to selected DS0 circuits. In these embodiments, a signal processor 1114 is included either separately (as shown) or as a part of the DS0 interface 1112. The signaling processor 1122 is configured to send control messages to the ATM interworking unit 1102 to implement particular features on particular DS0 circuits. Alternatively, lookup tables may be used to implement particular features for particular circuits or VP/VCs.

FIG. 12 illustrates another exemplary embodiment of an interworking unit which is an ATM interworking unit 1202 suitable for the present invention for use with an SDFI system. The ATM interworking unit 1202 preferably has a control interface 1204, an STM-N electrical/optical (E/O) interface 1206, an E3 interface 1208, an E1 interface 1210, an E0 interface 1212, a signal processor 1214, an AAL 1216, an STM-M electrical/optical (E/O) interface 1218, and a DPNSS interface 1220. As used herein in conjunction with STM, "N" refers to an integer, and "M" refers to an integer.

The control interface 1204 receives control messages from the signaling processor 1222, identifies E0 and virtual connection assignments in the control messages, and provides these assignments to the AAL 1216 for implementation. The control messages are received over an ATM virtual connection and through the STM-M interface 1218 to the control interface 1104 or directly through the control interface from a link.

The STM-N E/O interface 1206, the E3 interface 1208, the E1 interface 1210, the E0 interface 1212, and the DPNSS interface 1220 each can receive user communications from a second communication device 1224. Likewise, the STM-M E/O interface 1218 can receive user communications from a third communication device.

The STM-N E/O interface 1206 receives STM-N electrical or optical formatted user communications and converts the user communications from the STM-N electrical or STM-N optical format to the E3 format. The E3 interface 1208 receives user communications in the E3 format and demultiplexes the user communications to the E1 format. The E3 interface 1208 can receive E3s from the STM-N E/O interface 1206 or from an external connection. The E1 interface 1210 receives the user communications in the E1 format and demultiplexes the user communications to the E0 format. The E1 interface 1210 receives E1s from the STM-N E/O interface 1206 or the E3 interface 1208 or from an external connection. The E0 interface 1212 receives user communications in the E0 format and provides an interface to the AAL 1216. The DPNSS interface 1220 receives user communications in the DPNSS format and converts the user communications to the E0 format. In addition, each interface may transmit user communications in a like manner to the communication device 1224.

The STM-M E/O interface 1218 is operational to receive ATM cells from the AAL 1216 and to transmit the ATM cells over the connection to the communication device 1226. The STM-M E/O interface 1218 may also receive ATM cells in the STM-M E/O format and transmit them to the AAL 1216.

Call signaling may be received through and transferred from the STM-N E/O interface 1206 and the DPNSS interface 1220. Also, call signaling may be received through and transferred from the STM-M E/O interface 1218. The call signaling may be connected on a connection or transmitted to the control interface directly or via another interface as explained above.

The AAL 1216 comprises both a convergence sublayer and a segmentation and reassembly (SAR) sublayer. The AAL obtains the identity of the E0 and the ATM VP/VC from the control interface 1204. The AAL 1216 is operational to convert between the E0 format and the ATM format, either in response to a control instruction or without a control instruction. AAL's are known in the art. If desired, the AAL 1216 can be configured to receive control messages through the control interface 1204 for N×64 user communications.

E0 connections are bi-directional and ATM connections typically are uni-directional. As a result, two virtual connections in opposing directions typically will be required for each E0. Those skilled in the art will appreciate how this can be accomplished in the context of the invention.

In some instances, it may be desirable to incorporate digital signal processing capabilities at the E0 level. Also, it may be desirable to apply echo control. In these embodiments, a signal processor 1214 is included either separately (as shown) or as a part of the E0 interface 1212. The signaling processor 1222 is configured to send control messages to the ATM interworking unit 1202 to implement particular features on particular circuits. Alternatively, lookup tables may be used to implement particular features for particular circuits or VP/VCs.

The Signaling Processor

The signaling processor receives and processes telecommunications call signaling, control messages, and customer data to select connections that establish communication paths for calls. In the preferred embodiment, the signaling processor processes SS7 signaling to select connections for a call. An example of call processing in a call processor and the associated maintenance that is performed for call processing is described in a U.S. patent application Ser. No. 09/026,766 entitled "System and Method for Treating a Call for Call Processing," which is incorporated herein by reference.

In addition to selecting connections, the signaling processor performs many other functions in the context of call processing. It not only can control routing and select the actual connections, but it also can validate callers, control echo cancellers, generate accounting information, invoke intelligent network functions, access remote databases, manage traffic, and balance network loads. One skilled in the art will appreciate how the signaling processor described below can be adapted to operate in the above embodiments.

Figure 13:
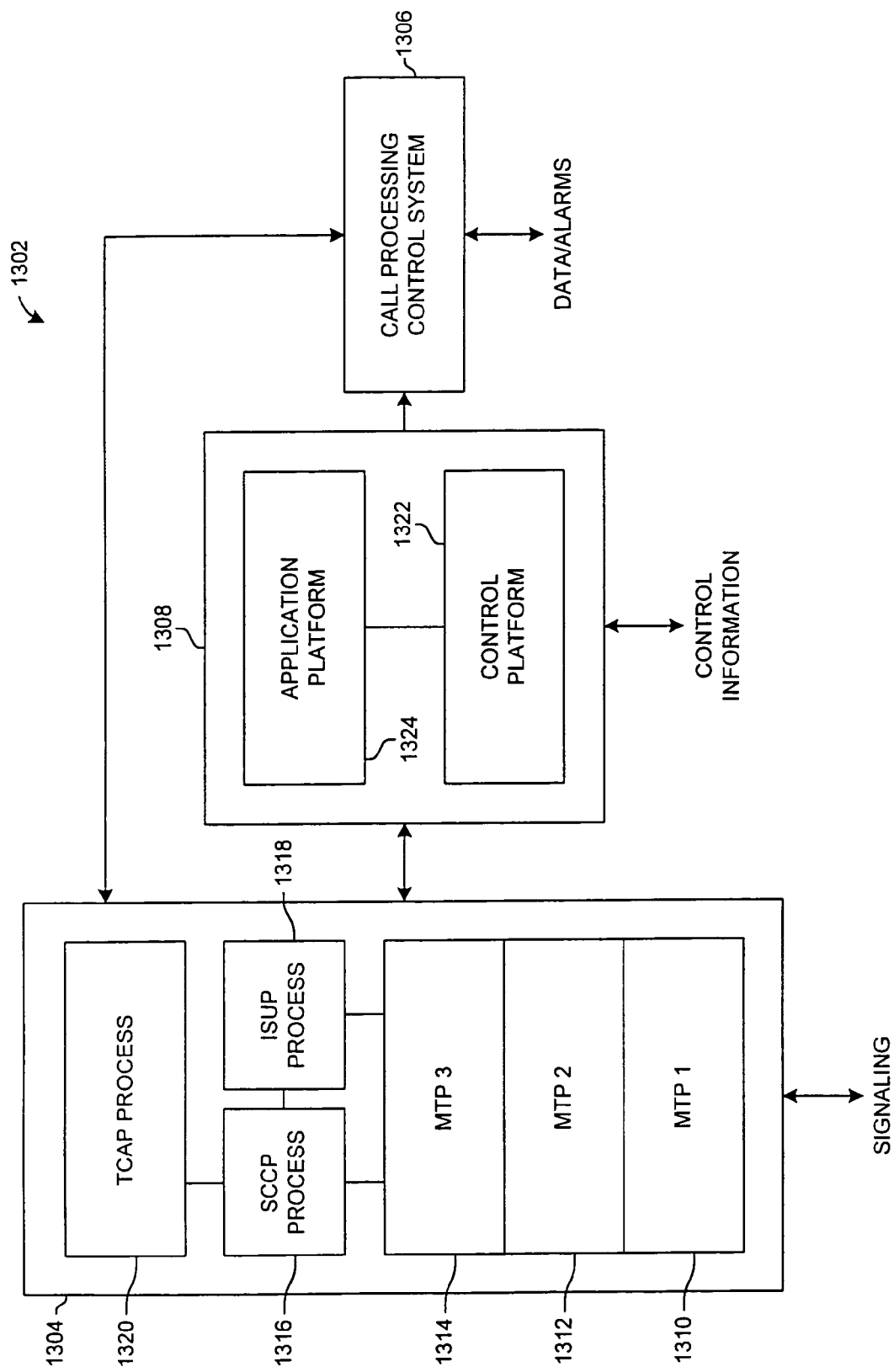
FIG. 13 is a block diagram of a signaling processor constructed in accordance with the present system.

FIG. 13 depicts an embodiment of a signaling processor. Other versions also are contemplated. In the embodiment of FIG. 13, the signaling processor 1302 has a signaling interface 1304, a call processing control system 1306 (CPCS), and a call processor 1308. It will be appreciated that the signaling processor 1302 may be constructed as modules in a single unit or as multiple units.

The signaling interface 1304 is coupled externally to signaling systems—preferably to signaling systems having a message transfer part (MTP), an ISDN user part (ISUP), a signaling connection control part (SCCP), an intelligent network application part (I-NAP), and a transaction capabilities application part (TCAP). The signaling interface 1304 preferably is a platform that comprises an MTP level 1 1310, an MTP level 2 1312, an MTP level 3 1314, an SCCP process 1316, an ISUP process 1318, and a TCAP process 1320. The signaling interface 1304 also has INAP functionality.

The signaling interface 1304 may be linked to a communication device (not shown). For example, the communication device may be an SCP which is queried by the signaling interface with a TCAP queue to obtain additional call-associated data, The answer message may have additional information, parameters that are required to complete call processing. The communication device also may be an STP or other device.

The signaling interface 1304 is operational to transmit, process, and receive call signaling. The TCAP, SCCP, ISUP, and I-NAP functionality use the services of the MTP to transmit and receive the messages. Preferably, the signaling interface 1304 transmits and receives SS7 messages for MTP, TCAP, SCCP, and ISUP. Together, this functionality is referred to as an "SS7 stack," and it is well known. The software required by one skilled in the art to configure an SS7 stack is commercially available. One example is the OMNI SS7 stack from Dale, Gesek, McWilliams & Sheridan, Inc. (the DGM&S company).

The processes of the signaling interface 1304 process information that is received in message signal units (MSUs) and convert the information to call information elements that are sent to the call processor 1308 to be processed. A call information element may be, for example, an ISUP IAM message parameter from the MSU. The signaling interface 1304 strips the unneeded header information from the MSU to isolate the message information parameters and passes the parameters to the call processor 1308 as the call information elements. Examples of these parameters are the called number, the calling number, and user service information. Other examples of messages with information elements are an ANM, an ACM, an REL, an RLC, and an INF. In addition, call information elements are transferred from the call processor 1308 back to the signaling interface 1304, and the information elements are reassembled into MSUs and transferred to a signaling point.

The CPCS 1306 is the above-described management and administration system. As described above, the CPCS 1306 is the user interface and external systems interface into the call processor 1308. The CPCS 1306 serves as a collection point for call-associated data such as logs, operational measurement data, statistical information, accounting information, and other call data. The CPCS 1306 can configure the call-associated data and/or transmit it to reporting centers.

The CPCS 1306 accepts data, such as the translations, from a source as an operations system and updates the data in the tables in the call processor 1308. The CPCS 1306 ensures that this data is in the correct format prior to transferring the data to the call processor 1308. The CPCS 1306 also provides configuration data to other devices including the call processor 1308, the signaling interface 1304, the interworking unit (not shown), and the controllable ATM matrix (not shown). In addition, the CPCS 1306 provides for remote control of call monitoring and call tapping applications from the call processor 1308.

The CPCS 1306 also serves as a collection point for alarms. Alarm information is transferred to the CPCS 1306. The CPCS 1306 then transports alarm messages to the required communication device. For example, the CPCS 1306 can transport alarms to an operations center.

The CPCS 1306 also has a human-machine interface (HMI). This allows a person to log onto the CPCS 1306 and manage data tables or review data tables in the CPCS or provide maintenance services.

The call processor 1308 processes call signaling and controls an ATM interworking unit, such as an ATM interworking multiplexer (mux) that performs interworking of DS0s and VP/VCs, and an ATM matrix. However, the call processor 1308 may control other communications devices and connections in other embodiments.

The call processor 1308 comprises a control platform 1322 and an application platform 1324. Each platform 1322 and 1324 is coupled to the other platform.

The control platform 1322 is comprised of various external interfaces including an interworking unit interface, a controllable ATM matrix, an echo interface, a resource control interface, a call information interface, and an operations interface. The control platform 1322 is externally coupled to an interworking unit control, a controllable ATM matrix control, an echo control, a resource control, accounting, and operations. The interworking unit interface exchanges messages with at least one interworking unit. These messages comprise DS0 to VP/VC assignments, acknowledgments, and status information. The controllable ATM matrix interface exchanges messages with at least one controllable ATM matrix. These messages comprise DS0 to VP/VC assignments, VP/VC to VP/VC assignments, acknowledgments, and status information. The echo control interface exchanges messages with echo control systems. Messages exchanged with echo control systems might include instructions to enable or disable echo cancellation on particular DS0s, acknowledgments, and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to send and detect a tone for a continuity test.

The call information interface transfers pertinent call information to a call information processing system, such as to the CPCS 1306. Typical call information includes accounting information, such as the parties to the call, time points for the call, and any special features applied to the call. One skilled in the art will appreciate how to produce the software for the interfaces in the control platform 1322.

The application platform 1324 processes signaling information from the signaling interface 1304 to select connections. The identity of the selected connections are provided to the control platform 1322 for the interworking unit interface and/or for the controllable ATM matrix interface. The application platform 1324 is responsible for validation, translation, routing, call control, exceptions, screening, and error handling. In addition to providing the control requirements for the interworking unit and the controllable ATM matrix, the application platform 1324 also provides requirements for echo control and resource control to the appropriate interface of the control platform 1322. In addition, the application platform 1324 generates signaling information for transmission by the signaling interface 1304. The signaling information might be for ISUP, INAP, or TCAP messages to external network elements. Pertinent information for each call is stored in an enhanced circuit data block (ECDB) for the call. The ECDB can be used for tracking and accounting the call.

The application platform 1324 preferably operates in general accord with the Basic Call State Model (BCSM) defined by the ITU. An instance of the BCSM is created to handle each call. The BCSM includes an originating process and a terminating process. The application platform 1324 includes a service switching function (SSF) that is used to invoke the service control function (SCF). Typically, the SCF is contained in an SCP. The SCF is queried with TCAP or INAP messages that are transported by the signaling interface 1304 and which are initiated with information from the SSF in the application platform 1324. The originating or terminating processes will access remote databases with intelligent network (IN) functionality via the SSF.

Software requirements for the application platform 1324 can be produced in specification and description language (SDL) defined in ITU-T Z.100 or similar logic or description languages. The SDL can be converted into C code. A real time case tool such as SDT from Telelogic, Inc. or Object Time from Object Time, Inc. can be used. Additional C and C++ code can be added as required to establish the environment. It will be appreciated that other software languages and tools may be used.

The call processor 1308 can be comprised of the above-described software loaded onto a computer. The computer can be a generally available fault-tolerant Unix computer, such as those provided by Sun, Tandem, or Hewlett Packard. It may be desirable to utilize the multi-threading capability of a Unix operating system.

From FIG. 13, it can be seen that the application platform 1324 processes signaling information to control numerous systems and facilitate call connections and services. The SS7 signaling is exchanged between the call processor 1308 and external components through the signaling interface 1304, and control information is exchanged with external systems through the control platform 1322. Advantageously, the signaling interface 1304, the CPCS 1306, and the call processor 1308 are not integrated into a switch central processing unit (CPU) that is coupled to a switching matrix. Unlike an SCP, the components of the signaling processor 1302 are capable of processing ISUP messages independently of TCAP queries.

SS7 Message Designation

SS7 messages are well known. Designations for various SS7 messages commonly are used designations:
ACM—Address Complete Message
ANM—Answer Message
BLO—Blocking
BLA—Blocking Acknowledgement
CPG—Call Progress
CGB—Circuit Group Blocking
CGBA—Circuit Group Blocking Acknowledgement
GRS—Circuit Group Reset
GRA—Circuit Group Reset Acknowledgement
CGU—Circuit Group Unblocking
CGUA—Circuit Group Unblocking Acknowledgement
CQM—Circuit Group Query Message
CQR—Circuit Group Query Response
CRM—Circuit Reservation Message
CRA—Circuit Reservation Acknowledgement
CVT—Circuit Validation Test
CVR—Circuit Validation Response
CFN—Confusion
COT—Continuity
CCR—Continuity Check Request
EXM—Exit Message
INF—Information
INR—Information Request
IAM—Initial Address Message
LPA—Loop Back Acknowledgement
PAM—Pass Along Message
REL—Release
RLC—Release Complete
RSC—Reset Circuit
RES—Resume
SUS—Suspend
UBL—Unblocking
UBA—Unblocking Acknowledgment
UCIC—Unequipped Circuit Identification Code.

Call Processor Tables

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 14:
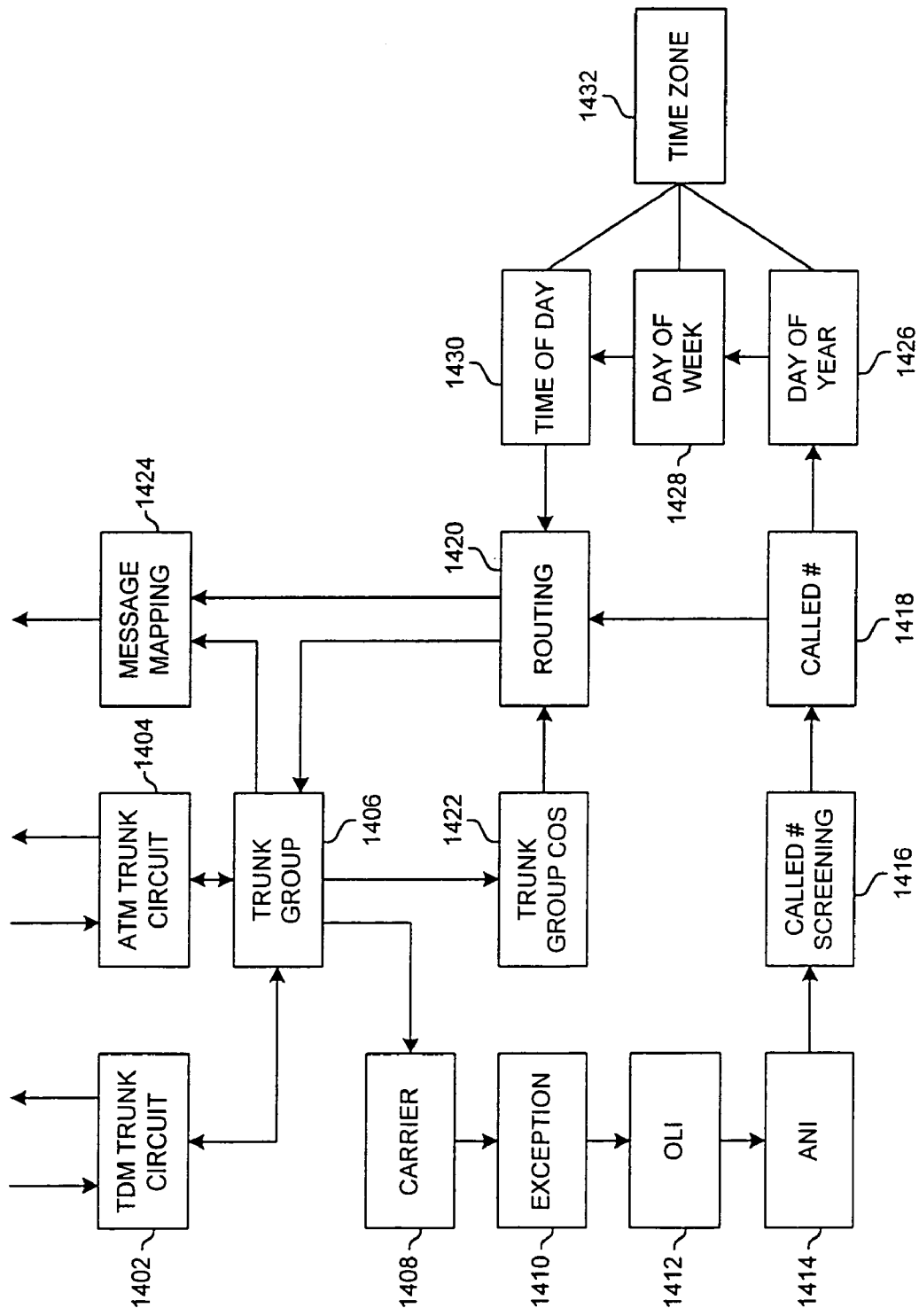
FIG. 14 is a block diagram of a data structure having tables that are used in the signaling processor of FIG. 13.

FIG. 14 depicts an exemplary data structure preferably used by the call processor 1302 of FIG. 13 to execute the BCSM. This is accomplished through a series of tables that point to one another in various ways. The pointers typically are comprised of next function and next label designations. The next function points to the next table, and the next label points to an entry or a range of entries in that table. It will be appreciated that the pointers for the main call processing are illustrated in FIG. 14.

The primary data structure has a TDM trunk circuit table 1402, an ATM trunk circuit table 1404, a trunk group table 1406, a carrier table 1408, an exception table 1410, an originating line information (OLI) table 1412, an automatic number identification (ANI) table 1414, a called number screening table 1416, a called number table 1418, a routing table 1420, a trunk group class of service (COS) table 1422, and a message mapping table 1424. Also included in the data structure are a day of year table 1426, a day of week table 1428, a time of day table 1430, and a time zone table 1432.

The TDM trunk circuit table 1402 contains information required to provision the TDM side of a connection from the call processor site. Each circuit on the TDM side of a connection has an entry. The TDM trunk circuit table 1402 is accessed from the trunk group table 1406 or an external call process, and it points to the trunk group table.

The ATM trunk circuit table 1404 contains information required to provision the ATM side of a connection. Typically, one record appears in this table per ATM trunk group. Although, the system can be configured alternately for multiple records per trunk group. The ATM trunk circuit table 1404 is accessed from the trunk group table 1406 or an external call process, and it points to the trunk group table.

The trunk group table 1406 contains information that is required to build trunk groups out of different trunk members identified in the TDM and ATM trunk circuit tables 1402 and 1404. The trunk group table 1406 contains information related to the originating and terminating trunk groups. The trunk group table 1406 typically points to the carrier table 1408. Although, the trunk group table 1406 may point to the exception table 1410, the OLI table 1412, the ANI table 1414, the called number screening table 1416, the called number table 1418, the routing table 1420, the day of year table 1426, the day of week table 1428, the time of day table 1430, and the treatment table (see FIG. 15).

For default processing of an IAM of an outgoing call in the forward direction, when the call process determines call setup and routing parameters for user communications on the originating portion, the trunk group table 1406 is the next table after the TDM and ATM trunk circuit tables 1402 and 1404, and the trunk group table points to the carrier table 1408. For default processing of an IAM of an outgoing call in the forward direction, when the call process determines call setup and routing parameters for user communications on the terminating portion, the trunk group table 1406 is the next table after the routing table 1420, and the trunk group table points to the TDM or ATM trunk circuit table 1402 or 1404. For default processing of an ACM or an ANM of an outgoing call in the originating direction, when the call process determines parameters for signaling, the trunk group table 1406 is the next table after the TDM or ATM trunk circuit table 1402 or 1404, and the trunk group table points to the message mapping table 1424. It will be appreciated that this is the default method, and, as explained herein, other implementations of table processing occur.

The carrier table 1408 contains information that allows calls to be screened based, at least in part, on the carrier information parameter and the carrier selection parameter. The carrier table 1408 typically points to the exception table 1410. Although, the carrier table 1408 may point to the OLI table 1412, the ANI table 1414, the called number screening table 1416, the called number table 1418, the routing table 1420, the day of year table 1426, the day of week table 1428, the time of day table 1430, the treatment table (see FIG. 15), and the database services table (see FIG. 16).

The exception table 1410 is used to identify various exception conditions related to the call that may influence the routing or handling of the call. The exception table 1410 contains information that allows calls to be screened based, at least in part, on the called party number and the calling party's category. The exception table 1410 typically points to the OLI table 1412. Although, the exception table 1410 can point to the ANI table 1414, the called number screening table 1416, the called number table 1418, the routing table 1420, the day of year table 1426, the day of week table 1428, the time of day table 1430, the call rate table, the percent control table, the treatment table (see FIG. 15), and the database services table (see FIG. 16).

The OLI table 1412 contains information that allows calls to be screened based, at least in part, on originating line information in an IAM. The OLI table 1412 typically points to the ANI table 1414. Although, the OLI table can point to the called number screening table 1416, the called number table 1418, the routing table 1420, the day of year table 1426, the day of week table 1428, the time of day table 1430, and the treatment table (see FIG. 15).

The ANI table 1414 is used to identify any special characteristics related to the caller's number, which is commonly known as automatic number identification. The ANI table 1414 is used to screen and validate an incoming ANI. ANI specific requirements such as queuing, echo cancellation, time zone, and treatments can be established. The ANI table 1414 typically points to the called number screening table 1416. Although, the ANI table 1414 can point to the called number table 1418, the routing table 1420; the day of year table 1426, the day of week table 1428, the time of day table 1430, and the treatment table (see FIG. 15).

The called number screening table 1416 is used to screen called numbers. The called number screening table 1416 determines the disposition of the called number and the nature of the called number. The called number screening table 1416 is used to provide the trigger detection point (TDP) for an AIN SCP TCAP query. It is used, for example, with the local number portability (LNP) feature. The called number screening table can invoke a TCAP. The called number screening table 1416 typically points to the called number table 1418. Although, the called number screening table 1416 can point to the routing table 1420, the treatment table, the call rate table, the percent table (see FIG. 15), and the database services table (see FIG. 16).

The called number table 1418 is used to identify routing requirements based on, for example, the called number. This will be the case for standard calls. The called number table 1418 typically points to the routing table 1410. In addition, the called number table 1426 can be configured to alternately point to the day of year table 1426. The called number table 1418 can also point to the treatment table (see FIG. 15) and the database services table (see FIG. 16).

The routing table 1420 contains information relating to the routing of a call for various connections. The routing table 1420 typically points to the treatment table (see FIG. 15). Although, the routing table also can point to the trunk group table 1406 and the database services table (see FIG. 16).

For default processing of an LAM of an outgoing call in the forward direction, when the call process determines call setup and routing parameters for user communications, the routing table 1420 is the next table after the called number table 1418, and the routing table points to the trunk group table 1406. For default processing of an IAM of an outgoing call in the forward direction, when the call process determines parameters for signaling, the routing table 1420 is the next table after the called number table 1418, and the routing table points to the message mapping table 1424. It will be appreciated that this is the default method, and, as explained herein, other implementations of table processing occur.

The trunk group COS table 1422 contains information that allows calls to be routed differently based on the class of service assigned to the originating trunk group and to the terminating trunk group. The trunk group COS table can point to the routing table 1420 or the treatment table (see FIG. 15).

When the trunk group COS table 1422 is used in processing, after the routing table 1420 and the trunk group table 1406 are processed, the trunk group table points to the trunk group COS table. The trunk group COS table points back to the routing table 1420 for further processing. Processing then continues with the routing table 1420 which points to the trunk group table 1406, and the trunk group table which points to the TDM or ATM trunk circuit table 1402 or 1404. It will be appreciated that this is the default method, and, as explained herein, other implementations of table processing occur.

The message mapping table 1424 is used to provide instructions for the formatting of signaling messages from the call processor. It typically can be accessed by the routing table 1420 or the trunk group table 1406 and typically determines the format of the outgoing messages leaving the call processor.

The day of year table 1426 contains information that allows calls to be routed differently based on the day of the year. The day of year table typically points to the routing table 1420 and references the time zone table 1432 for information. The day of year table 1426 also can point to the called number screening table 1416, the called number table 1418, the routing table 1420, the day of week table 1428, the time of day table 1430, and the treatment table (see FIG. 15).

The day of week table 1428 contains information that allows calls to be routed differently based on the day of the week. The day of week table typically points to the routing table 1420 and references the time zone table 1432 for information. The day of week table 1428 also can point to the called number screening table 1416, the called number table 1418, the time of day table 1430, and the treatment table (see FIG. 15).

The time of day table 1430 contains information that allows calls to be routed differently based on the tune of the day. The time of day table 1430 typically points to the routing table 1420 and references the time zone table 1432 for information. The time of day table 1430 also can point to the called number screening table 1416, the called number table 1418, and the treatment table (see FIG. 15).

The time zone table 1432 contains information that allows call processing to determine if the time associated with the call processing should be offset based on the time zone or daylight savings time. The time zone table 1432 is referenced by, and provides information to, the day of year table 1426, the day of week table 1428, and the time of day table 1430.

Figure 15:
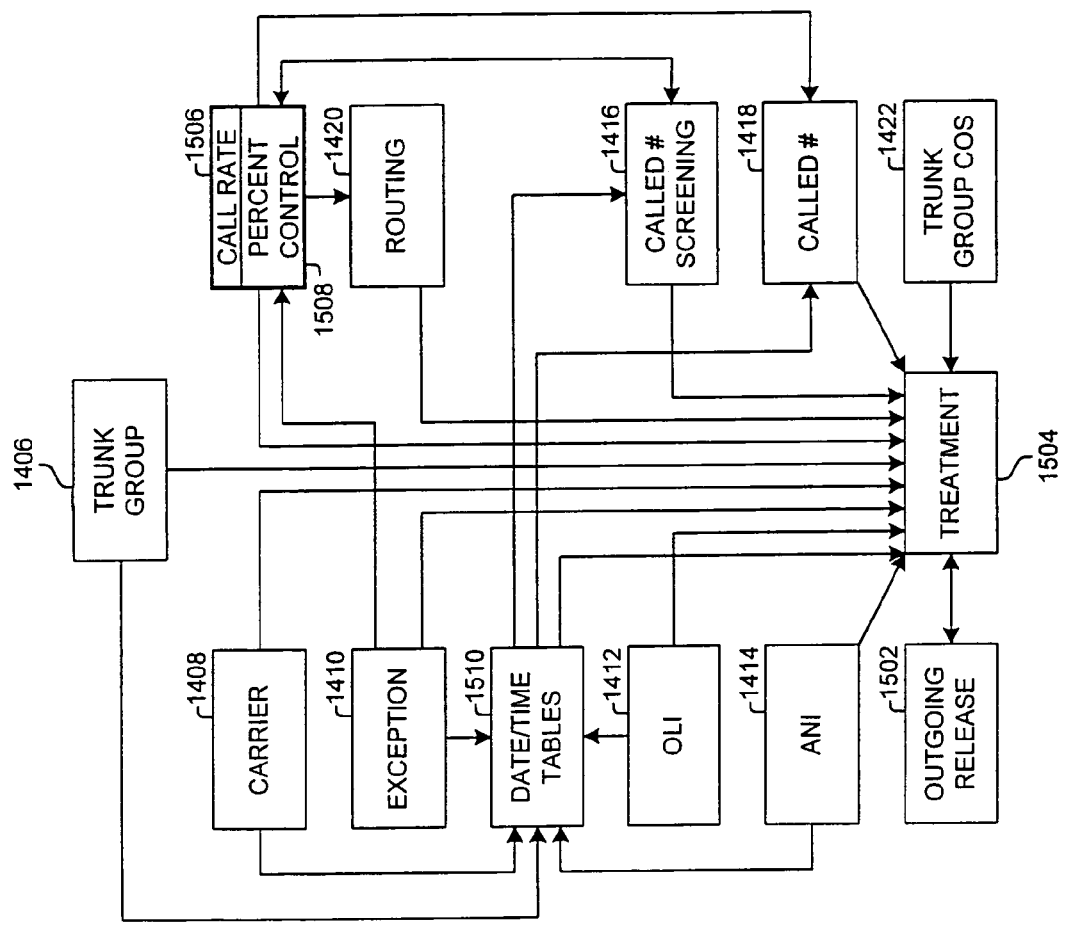
FIG. 15 is a block diagram of additional tables that are used in the signaling processor of FIG. 14.

FIG. 15 is an overlay of FIG. 14. The tables from FIG. 14 are present. However, for clarity, the table's pointers have been omitted, and some tables have not been duplicated in FIG. 15. FIG. 15 illustrates additional tables that can be accessed from the tables of FIG. 14. These include an outgoing release table 1502, a treatment table 1504, a call rate table 1506, and a percent control table 1508, and time/date tables 1510.

The outgoing release table 1502 contains information that allows call processing to determine how an outgoing release message is to be formatted. The outgoing release table 1502 typically points to the treatment table 1506.

The treatment table 1504 identifies various special actions to be taken in the course of call processing. For example, based on the incoming trunk group or ANI, different treatments or cause codes are used to convey problems to the called and calling parties. This typically will result in the transmission of a release message (REL) and a cause value. The treatment table 1504 typically points to the outgoing release table 1502 and the database services table (see FIG. 16).

The call rate table 1506 contains information that is used to control call attempts on an attempt per second basis. Preferably, attempts from 100 per second to 1 per minute are programmable. The call rate table 1506 typically points to the called number screening table 1416, the called number table 1418, the routing table 1420, and the treatment table 1504.

The percent control table 1508 contains information that is used to control call attempts based upon a percent value of the traffic that is processed through call processing. The percent control table 1508 typically points to the called number screening table 1416, the called number table 1418, the routing table 1420, and the treatment table 1504.

The date/time tables 1510 have been identified in FIG. 14 as the day of year table 1426, the day of week table 1428, the time of day table 1426, and the time zone table 1432. They are illustrated in FIG. 15 as a single location for ease and clarity but need not be so located.

Figure 16:
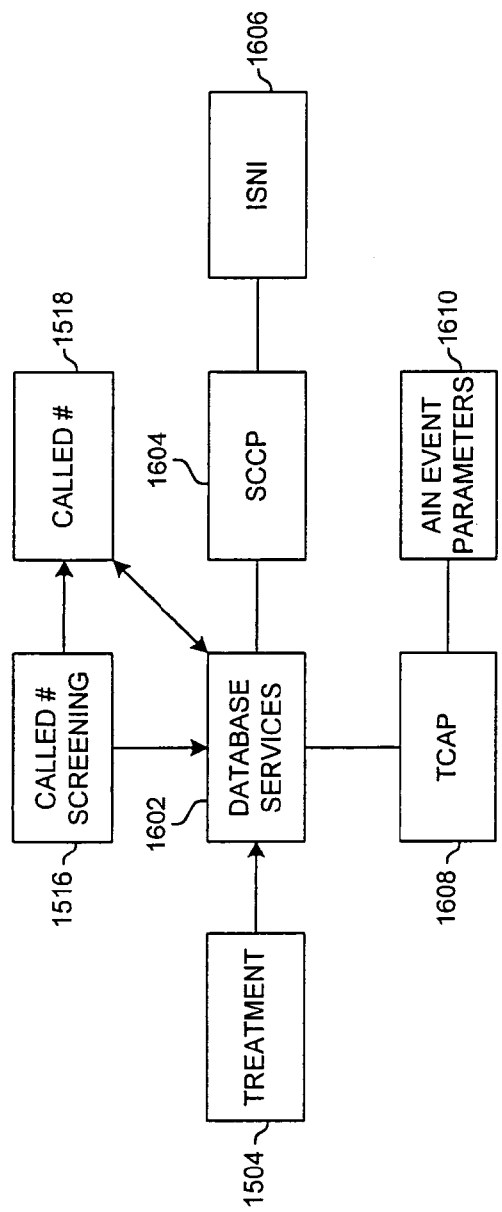
FIG. 16 is a block diagram of additional tables that are used in the signaling processor of FIG. 14.

FIG. 16 is an overlay of FIGS. 14-15. The tables from FIGS. 14-15 are present. However, for clarity, the table's pointers have been omitted, and some tables have not been duplicated in FIG. 16.

FIG. 16 illustrates additional tables that can be accessed from the tables of FIGS. 14-15 and which are directed to the TCAP and the SCCP message processes. These include a database services table 1602, a signaling connection control part (SCCP) table 1604, an intermediate signaling network identification (ISNI) table 1606, a transaction capabilities application part (TCAP) table 1608, and an advanced intelligent network (AIN) event parameters table 1610.

The database services table 1602 contains information about the type of database service requested by call processing. The database services table 1602 references and obtains information from the SCCP table 1604 and the TCAP table 1608. After the database function is performed, the call is returned to normal call processing. The database services table 1602 points to the called number table 1418.

The SCCP table 1604 contains information and parameters required to build an SCCP message. The SCCP table 1604 is referenced by the database services table 1602 and provides information to the database services table.

The ISNI table 1606 contains network information that is used for routing SCCP message to a destination node. The ISNI table 1606 is referenced by the SCCP table 1604 and provides information to the SCCP table.

The TCAP table 1608 contains information and parameters required to build a TCAP message. The TCAP table 1608 is referenced by the database services table 1602 and provides information to the database services table.

The AIN event parameters table 1610 contains information and parameters that are included in the parameters portion of a TCAP event message. The AIN event parameters table 1610 is referenced by the TCAP table 1608 and provides information to the TCAP table.

Figure 17:
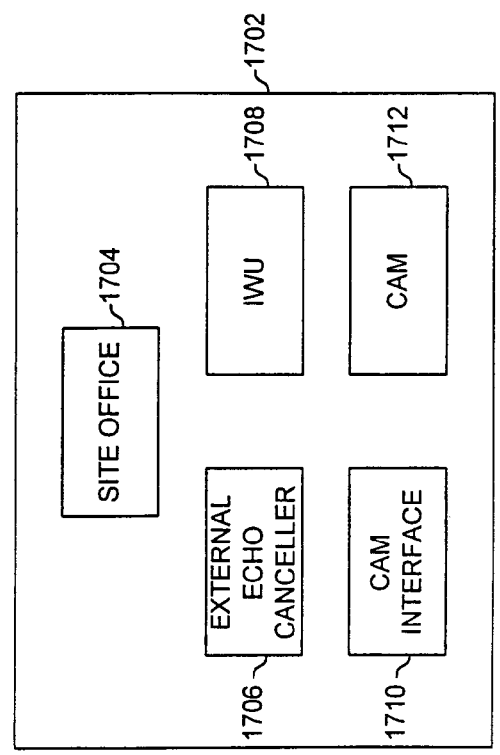
FIG. 17 is a block diagram of additional tables that are used in the signaling processor of FIG. 14.

FIG. 17 is an overlay of FIGS. 14-16. The tables from FIGS. 14-16 are present. However, for clarity, the tables have not been duplicated in FIG. 17. FIG. 17 illustrates additional tables that can be used to setup the call process so that the tables of FIGS. 14-16 may be used. These setup tables 1702 include a site office table 1704, an external echo canceller table 1705, an interworking unit (IWU) table 1708, a controllable ATM matrix (CAM) interface table 1710, and a controllable ATM matrix (CAM) table 1712.

The site office table 1704 contains information which lists office-wide parameters, some of which are information-based and others which affect call processing. The site office table 1704 provides information to the call processor or switch during initialization or other setup procedures, such as population of data or transfer of information to one or more memory locations for use during call processing.

The external echo canceller 1706 contains information that provides the interface identifier and the echo canceller type when an external echo canceller is required. The external echo canceller table 1706 provides information to the call processor or switch during initialization or other setup procedures, such as population of data or transfer of information to one or more memory locations for use during call processing.

The IWU table 1708 contains the internet protocol (IP) identification numbers for interfaces to the interworking units at the call processor or switch site. The IWU table 1708 provides information to the call processor or switch during initialization or other setup procedures, such as population of data or transfer of information to one or more memory locations for use during call processing.

The CAM interface table 1710 contains information for the logical interfaces associated with the CAM. The CAM interface table 1710 provides information to the call processor or switch during initialization or other setup procedures, such as population of data or transfer of information to one or more memory locations for use during call processing.

The CAM table 1712 contains information associated with the logical and physical setup properties of the CAM. The CAM table 1712 provides information to the call processor or switch during initialization or other setup procedures, such as population of data or transfer of information to one or more memory locations for use during call processing.

FIGS. 18-47 depict examples of the various tables described above. It will be appreciated that other versions of tables may be used. In addition, information from the identified tables may be combined or changed to form different tables.

FIG. 18 depicts an example of a TDM trunk circuit table. The TDM trunk circuit table is used to access information about the originating circuit for originating circuit call processing. It also is used to provide information about the terminating circuit for terminating circuit call processing. The trunk group number of the circuit associated with the call is used to enter the table. The group member is the second entry, that is used as a key to identify or fill information in the table. The group member identifies the member number of the trunk group to which the circuit is assigned, and it is used for the circuit selection control.

The table also contains the trunk circuit identification code (TCIC). The TCIC identifies the trunk circuit which is typically a DS0. The echo canceller (EC) label entry identifies the echo canceller, if any, which is connected to the circuit. The interworking unit (IWU) label and the interworking unit (IWU) port identify the hardware location and the port number, respectively, of the interworking unit. The DS1/E1 label and the DS1/E1 channel denote the DS1 or the E1 and the channel within the DS1 or E1, respectively, that contains the circuit. The initial state specifies the state of the circuit when it is installed. Valid states include blocked if the circuit is installed and blocked from usage, unequipped if the circuit is reserved, and normal if the circuit is installed and available from usage.

FIG. 19 depicts an example of an ATM trunk circuit table. The ATM trunk circuit table is used to access information about the originating circuit for originating circuit call processing. It also is used to provide information about the terminating circuit for terminating circuit call processing.

The trunk group number of the circuit associated with the call is used to enter the table. The group size denotes the number of members in the trunk group. The starting trunk circuit identification code (TCIC) is the starting TCIC for the trunk group, and it is used in the routing label of an ISUP message. The transmit interface label identifies the hardware location of the virtual path on which the call will be transmitted. The transmit interface label may designate either an interworking unit interface or a CAM interface for the designated trunk members. The transmit virtual path identifier (VPI) is the VP that will be used on the transmission circuit side of the call. The receive interface label identifies the hardware location of the virtual path on which the call will be received. The receive interface label may designate either an interworking unit interface or a CAM interface for the designated trunk members, The receive virtual path identifier (VPI) is the VP that will be used on the reception circuit side of the call. The initial state specifies the state of the circuit when it is installed. Valid states include blocked if the circuit is installed and blocked from usage, unequipped if the circuit is reserved, and normal if the circuit is installed and available from usage.

FIG. 20A depicts an example of a trunk group table. The trunk group number of the trunk group associated with the circuit is used to key into the trunk group table. The administration information field is used for information purposes concerning the trunk group and typically is not used in call processing. The associated point code is the point code for the far end switch or call processor to which the trunk group is connected. The common language location identifier (CLLI) entry is a standardized Bellcore entry for the associated office to which the trunk group is connected. The trunk type identifies the type of the trunk in the trunk group. The trunk type may be a TDM trunk, an ATM trunk from the interworking unit, or an ATM trunk from the CAM.

The associated numbering plan area (NPA) contains information identifying the switch from which the trunk group is originating or to which the trunk group is terminating. The associated jurisdiction information parameter (JIP) contains information identifying the switch from which the trunk group is originating or to which the trunk group is terminating. If an ISUP JIP is received, an outgoing JIP has the same value as the received JIP. If an ISUP JIP is not received in an IAM, and a default JIP value is present, then call processing will populate the JIP of the outgoing IAM with the default value from the trunk group table. If a JIP is not received, and there is no default JIP value, then an outgoing JIP is not transmitted.

The time zone label identifies the time zone that should be used when computing a local date and a local time for use with a day of year table, the day of week table, and the time of day table. The echo canceller information field describes the trunk group echo cancellation requirements. Valid entries for the echo canceller information include normal for a trunk group that uses internal echo cancellation, external for a trunk group that requires external echo cancellers, and disable for a trunk group that requires no echo cancellation for any call passing over the group.

FIG. 20B is a continuation of FIG. 20A for the trunk group table. The satellite entry specifies that the trunk group for the circuit is connected through a satellite. If the trunk group uses too many satellites, then a call should not use the identified trunk group. This field is used in conjunction with the nature of connection satellite indicator field from the incoming IAM to determine if the outgoing call can be connected over this trunk group. The select sequence indicates the methodology that will be used to select a connection. Valid entries for the select sequence field include the following: most idle, least idle, ascending, or descending. The interworking unit (IWU) priority signifies that outgoing calls will attempt to use a trunk circuit on the same interworking unit before using a trunk circuit on a different interworking unit.

Glare resolution indicates how a glare situation is to be resolved. Glare is the dual seizure of the same circuit. If the glare resolution entry is set to "even/odd," the switch or the call processor with the higher point code value will control the even number TCICs within the trunk group. The switch or call processor with the lower point code value will control the odd number TCICs. If the glare resolution entry is set to "all," the call processor controls all of the TCICs within the trunk group: If the glare resolution entry is set to "none," the call processor will have no glare control and will yield to all double seizures within the trunk group.

Continuity control indicates whether continuity is to be checked. Continuity for outgoing calls on the originating call processor are controlled on a trunk group basis. This field specifies whether continuity is not required or whether continuity is required and the frequency of the required check. The field identifies a percentage of the calls that require continuity check.

The reattempt entry specifies how many times the outgoing call will be re-attempted using a different circuit from the same trunk group after a continuity check failure, a glare, or other connection failure. The ignore local number portability (LNP) information specifies whether or not the incoming LNP information is ignored. The treatment label is a label into the treatment table for the trunk group used on the call. Because specific trunk group connections may require specific release causes or treatments for a specific customer, this field identifies the type of treatment that is required. The message mapping label is a label into the message mapping table which specifies the backward message configuration that will be used on the trunk group.

FIG. 20C is a continuation of FIG. 20B for the trunk group table. The queue entry signifies that the terminating part of the trunk group is capable of queuing calls originating from a subscriber that called a number which terminates in this trunk group. The ring no answer entry specifies whether the trunk group requires ring no answer timing. If the entry is set to 0, the call processing will not use the ring no answer timing for calls terminated on the trunk group. A number other than 0 specifies the ring no answer timing in seconds for calls terminating on this trunk group. The voice path cut through entry identifies how and when the terminating call's voice path will be cut through on the trunk group. The options for this field include the following: connect for a cut through in both directions after receipt of an ACM, answer for cut through in the backward direction upon receipt of an ACM, then cut through in the forward direction upon receipt of an ANM, or immediate for cut through in both directions immediately after an IAM has been sent.

The originating class of service (COS) label provides a label into a class of service table that determines how a call is handled based on the combination of the originating COS and the terminating COS from another trunk group. Based on the combination of this field and the terminating COS of another trunk group's field, the call will be handled differently. For example, the call may be denied, route advanced, or otherwise processed. The terminating class of service (COS) label provides a label into a class of service table that determines how a call is handled based on the combination of the originating COS from another trunk group and the terminating COS from the present trunk group. Based on a combination of this field and the originating COS the call will be handled differently. For example, the call may be denied, route advanced, or otherwise processed.

Call control provides an index to a specific trunk group level traffic management control. Valid entries include normal for no control applied, skip control, applied wide area telecommunications service (WATS) reroute functionality, cancel control, reroute control overflow, and reroute immediate control. The next function points to the next table, and the next label points to an entry or a range of entries in that table.

FIG. 21 depicts an example of a carrier table. The carrier label is the key to enter the table. The carrier identification (ID) specifies the carrier to be used by the calling party. The carrier selection entry identifies how the caller specifies the carrier. For example, it identifies whether the caller dialed a prefix digit or whether the caller was pre-subscribed. The carrier selection is used to determine how the call will be routed. The next function points to the next table, and the next label defines an area in that table for further call processing.

FIG. 22 depicts an example of an exception table. The exception label is used as a key to enter the table. The calling party's category entry specifies how to process a call from an ordinary subscriber, an unknown subscriber, or a test phone. The called number nature of address differentiates between 0+ calls, 1+ calls, test calls, local routing number (LRN) calls, and international calls. For example, international calls might be routed to a pre-selected international carrier. The called number "digits from" and "digits to" focus further processing unique to a defined range of called numbers. The "digits from" field is a decimal number ranging from 1-15 digits. It can be any length and, if filled with less than 15 digits, is filled with 0s for the remaining digits. The "digits to" is a decimal number ranging from 1-15 digits. It can be any length and, if filled with less than 15 digits, is filled with 9s for the remaining digits. The next function and next label entries point to the next table and the next entry within that table for the next routing function.

FIG. 23 depicts an example of the originating line information (OLI) table. The OLI label is used as a key to enter the table from a prior next function operation. The originating line information entry specifies the information digits that are being transmitted from a carrier. Different calls are differentiated based on the information digits. For example, the information digits may identify an ordinary subscriber, a multi-party line, N00 service, prison service, cellular service, or private pay station. The next function and next label entries point to the next table and the area within that table for the next routing function.

FIG. 24 depicts an example of an automatic number identification (ANI) table. The ANI label is used as a key to enter the table from a prior next option. The charge calling party number "digits from" and "digits to" focus further processing unique to ANI within a given range. These entries are looked at to determine if the incoming calling number falls within the "digits from" and "digits to" fields. The time zone label indicates the entry in the time zone table that should be used when computing the local date and time. The time zone label overrides the time zone information from the trunk group table 1406.

The customer information entry specifies further customer information on the originating side for call process routing. The echo cancellation (EC) information field specifies whether or not to apply echo cancellation to the associated ANL. The queue entry identifies whether or not queuing is available to the calling party if the called party is busy. Queuing timers determine the length of time that a call can be queued. The treatment label defines how a call will be treated based on information in the treatment table. For example, the treatment label may send a call to a specific recording based on a dialed number. The next function and next label point to the next table and an area within that table for further call processing.

FIG. 25 depicts an example of a called number screening table. The called number screening label is used as a key to enter the table. The called number nature of address indicates the type of dialed number, for example, national versus international. The nature of address entry allows the call process to route a call differently based on the nature of address value provided. The "digits from" and "digits to" entries focus further processing unique to a range of called numbers. The "digits from" and "digits to" columns both contain called number digits, such as NPA-NXX ranges, that may contain ported numbers and are checked for an LRN. This table serves as the trigger detection point (TDP) for an LNP TCAP when, for example, NPA-NXXs of donor switches that have had subscribers port their numbers are data filled in the "digits from" and "digits to" fields. The delete digits field provides the number of digits to be deleted from the called number before processing continues. The net function and next label point to the next table and the area within that table for further call processing.

FIG. 26 depicts an example of a called number table. The called number label is used as a key to enter the table. The called number nature of address entry indicates the type of dialed number, for example, national versus international. The "digits from" and "digits to" entries focus further processing unique to a range of numbers, including LRNs. The next function and next label point to a next table and the area within that table used for further call processing.

FIG. 27 depicts an example of a day of year table. The day of year label is used as a key to enter the table. The date field indicates the local date which is applicable to the action to be taken during the processing of this table. The next function and next label identify the table and the area within that table for further call processing.

FIG. 28 depicts an example of a day of week table. The day of week label is a key that is used to enter the table. The "day from" field indicates the local day of the week on which the action to be taken by this table line entry is to start. The "day to" field indicates the local day of the week on which the action to be taken by this table line entry is to end. The next function and next label identify the next table and the area within that table for further call processing.

FIG. 29 depicts an example of a time of day table. The time of day table is used as a key to enter the table from a prior next function. The "time from" entry indicates the local time on which an action to be taken is to start. The "time to" field indicates the local time just before which the action to be taken is to stop. The next function and next label entries identify the next table and the area within that table for further call processing.

FIG. 30 depicts an example of a time zone table. The time zone label is used as a key to enter the table and to process an entry so that a customer's local date and time may be computed. The coordinated universal time (UTC) indicates a standard offset of this time zone from the UTC. The UTC is also known as Greenwich mean time, GMT, or Zulu. The UTC should be positive for time zones east of Greenwich, such as Europe and Asia, and negative for time zones West of Greenwich, such as North America. The daylight savings entry indicates whether daylight savings time is used during the summer in this time zone.

FIG. 31 depicts an example of a routing table. The routing label is used as a key to enter the table from a prior next function. The route number specifies a route within a route list. Call processing will process the route choices for a given route label in the order indicated by the route numbers. The next function and next label identify the next table and the area within that table for further call processing. The signal route label is associated with the next action to be taken by call processing for this call. The signal route label provides the index to access the message mapping label. The signal route label is used in order to modify parameter data fields in a signaling message that is being propagated to a next switch or a next call processor.

FIG. 32 depicts an example of a trunk group class of service (COS) table. The originating trunk COS label and the terminating trunk COS label are used as keys to enter the table and define call processing. The next function identifies the next action that will be taken by call processing for this call. Valid entries in the next function column may be continued, treat, route advanced, or routing. Based on these entries call processing may continue using the current trunk group, send the calls to treatment, skip the current trunk group and the routing table and go to the next trunk group on the list, or send the call to a different label in the routing table. The next label entry is a pointer that defines the trunk circuit group that the next function will use to process the call. This field is ignored when the next function is continued or route advanced.

FIG. 33 depicts an example of a treatment table. The treatment label is a key that is used to enter the table. The treatment label is a designation in a call process that determines the disposition of the call. The error/cause label correspond either to internally generated error conditions and call processing or to incoming release cause values. For each treatment label, there will be a set of error conditions and cause values that will be associated with a series of labels for the call processing error conditions and a series of labels for all incoming release message cause values. The next function and next label point to the next table and the area within that table for further call processing.

FIG. 34 depicts an example of an outgoing release table. The outgoing release label is used as a key to enter the table for processing. The outgoing cause value location identifies the type of network to be used. For example, the location entry may specify a local or remote network or a private, transit, or international network. The coding standard identifies the standard as an International Telecommunications Union (ITU) standard or an American National Standards Institute (ANSI) standard. The cause value designates error, maintenance, or non-connection processes.

FIG. 35 depicts an example of a percent control table. The percent label is used as a key to enter the table. The control percentage specifies the percentage of incoming calls that will be affected by the control. The control next function allows attempts for call connection to be routed to another table during call processing. The control next label points to an area within that table for further call processing. The passed next function allows only incoming attempts to be routed to another table. The next label points to an area in that table for further call processing.

FIG. 36 depicts an example of a call rate table. The call rate label is used as a key to enter the table. The call rate specifies the number of calls that will be passed by the control on or for completion. Call processing will use this information to determine if the incoming call number falls within this control. The control next function allows a blocked call attempt to be routed to another table. The control next label is a pointer that defines the area in the next table for further call processing. The passed next function allows only an incoming call attempt to be rerouted to another table. The passed next function is a pointer that defines an area in that table for further call processing.

FIG. 37 depicts an example of a database services table. The database services label is used as a key to enter the table. The service type determines the type of logic that is applied when building and responding to database queries. Service types include local number portability and N00 number translation. The signaling connection control part (SCCP) label identifies a location within an SCCP table for further call processing. The transaction capabilities application part (TCAP) label identifies a location within a TCAP table for further processing. The next function identifies the location for the next routing function based on information contained in the database services table as well as information received from a database query. The next label entry specifies an area within the table identified in the next function for further processing.

FIG. 38A depicts an example of a signaling connection control part (SCCP) table. The SCCP label is used as a key to enter the field. The message type entry identifies the type of message that will be sent in the SCCP message. Message types include Unitdata messages and Extended Unitdata messages. The protocol class entry indicates the type of protocol class that will be used for the message specified in the message type field. The protocol class is used for connectionless transactions to determine whether messages are discarded or returned upon an error condition. The message handling field identifies how the destination call processor or switch is to handle the SCCP message if it is received with errors. This field will designate that the message is to be discarded or returned. The hop counter entry denotes the number of nodes through which the SCCP message can route before the message is returned with an error condition. The segmentation entry denotes whether or not this SCCP message will use segmentation and send more than one SCCP message to the destination.

FIG. 38B is a continuation of FIG. 38A for the SCCP table. The intermediate signaling network identification (ISNI) fields allow the SCCP message to traverse different networks in order to reach a desired node. The ISNI type identifies the type of ISNI message format that will be used for this SCCP message. The route indicator subfield identifies whether or not this SCCP message requires a special type of routing to go through other networks. The mark identification subfield identifies whether or not network identification will be used for this SCCP message, The label subfield identifies a unique address into the ISNI table when the route indicator sub-field is set to "constrained" and the mark identification subfield is set to "yes."

FIG. 38C is a continuation of FIG. 38B for the SCCP table. FIG. 38C identifies the called party address field and subfields to provide information on how to route this SCCP message. The address indicator subsystem number (SSN) indicates whether or not a subsystem number will be included in the called party address. The point code entry indicates whether or not a point code will be included in the calling party address. The global title indicator subfield identifies whether or not a global title translation will be used to route the SCCP message. If a global title translation is chosen, this subfield also identifies the type. The routing indicator subfield identifies the elements that will be used to route the message. Valid entries include global title and point code. The national/international subfield identifies whether the SCCP message will use national or international routing and set up.

The subsystem number field identifies the subsystem number for the SCCP message. The point code number indicates the destination point code to which the SCCP message will be routed. This field will be used for routing messages that do not require SCCP translation. The global title translation field allows intermediate nodes to translate SCCP messages so that the messages can be muted to the correct destination with the correct point code. The global title translation type entry directs the SCCP message to the correct global title translation function. The encode scheme identifies how the address type will be encoded. The number plan subfield identifies the numbering plan that will be sent to the destination node. The address type subfield will identify which address type to use for address digits and the SCCP routing through the network.

FIG. 38D is a continuation of FIG. 38C for the SCCP table. FIG. 38D identifies the calling party address field which contains the routing information that the destination database uses to retain the SCCP message. The address indicator subsystem number (SSN) indicates whether or not a subsystem number will be included in the called party address. The point code subfield indicates whether or not a point code will be included in the calling party address. The global title indicator subfield identifies whether or not global rifle translation will be used to route the SCCP message. The routing indicator subfield identifies which elements will be used throughout the message. This field may include global title elements or point code elements. The national/international subfield identifies whether the SCCP will use national or international routing and set up.

The subsystem number identifies a subsystem number for the SCCP message. The point code number field indicates the destination point code to which the SCCP message will be routed. The global title translations allow the intermediate nodes to translate SCCP messages and to route the messages to the correct destination. The global title translation type directs the SCCP message to the correct global title translation function. The encode scheme identifies how the address type will be encoded. The number plan identifies the number plan that will be sent to the destination node. The address type subfield identifies the address type to use for address digits in the SCCP routing through the network.

FIG. 39 depicts an example of an intermediate signaling network identification (ISNI) table. The ISNI table contains a list of networks that will be used for routing SCCP messages to the destination node. The ISNI label is used as a key to enter the table. The network fields 1-16 identify the network number of up to 16 networks that may be used for routing the SCCP message.

FIG. 40 depicts an example of a transaction capabilities application part (TCAP) table. The TCAP label is used as a key to enter the table. The TCAP type identifies the type of the TCAP that will be constructed. The TCAP types include advanced intelligent network (AIN) and distributed intelligent network architecture (DINA). The tag class indicates whether the message will use a common or proprietary structure. The package type field identifies the package type that will be used in the transaction portion of the TCAP message. The component type field identifies the component type that will be used in the component portion of the TCAP message. The message type field identifies the type of TCAP message. Message types include variable options depending on whether they are AIN message types or DINA message types.

FIG. 41 depicts an example of an external echo canceller table. The echo canceller type specifies if an external echo canceller is being used on the circuit and, if so, the type of echo canceller. The echo canceller label points to a location in the controllable ATM matrix table for further call processing. The RS-232 address is the address of the RS-232 interface that is used to communicate with the external echo canceller. The module entry is the module number of the external echo canceller.

FIG. 42 depicts an example of an interworking unit interface table. The interworking unit (IWU) is a key that is used to enter the table. The IWU identification (ID) identifies which interworking unit is being addressed. The internet protocol (IP) sockets 1-4 specify the IP socket address of any of the four connections to the interworking unit.

FIG. 4B depicts an example of a controllable ATM matrix (CAM) interface table. The CAM interface label is used as a key to enter the table. The CAM label indicates which CAM contains the interface. The logical interface entry specifies a logical interface or port number in the CAM.

FIG. 44 depicts an example of a controllable ATM matrix (CAM) table. The CAM label is used as a key to enter the table. The CAM type indicates the type of CAM control protocol. The CAM address identifies the address of the CAM.

FIG. 45A depicts an example of a call processor or switch site office table. The office CLLI name identifies a CLLI of the associated office for the call processor or switch. The call processor or switch site node identifier (ID) specifies the call processor or switch node identifier. The call processor or switch origination identifier (ID) specifies a call processor or switch origination identifier. The software identifier (ID) specifies a software release identifier. The call processor identifier (ID) specifies the call processor or switch identifier that is sent to the inter working units.

FIG. 45B is a continuation of FIG. 45A of the call processor or switch site office table. The automatic congestion control (ACC) specifies whether ACC is enabled or disabled. The automatic congestion control level (ACL) 1 onset identifies an onset percentage value of a first buffer utilization. The ACL 1 abate entry specifies an abatement percentage of utilization for a first buffer. The ACL 2 onset entry specifies an onset level for a second buffer. The ACL 2 abate entry specifies an abatement level percentage of buffer utilization for a second buffer. The ACL 3 onset entry specifies an onset level percentage of buffer utilization for a third buffer. The ACL 3 abate entry specifies an abatement level percentage of buffer utilization for a third buffer.

FIG. 45C is a continuation of FIG. 45B for the call processor or switch site office table. The maximum trunks for the off hook queuing (max trunks OHQ) specifies a maximum number of trunk groups that can have the off hook queuing enabled. The OHQ timer one (TQI) entry specifies the number of milliseconds for the off hook timer number one. The OHQ timer two (TQ2) entry specifies the number of seconds for the off hook timer number two. The ring no answer timer specifies the number of seconds for the ring no answer timer. The billing active entry specifies whether ECDBs are being sent to the call processing control system (CPCS). The network management (NWIVI) allow entry identifies whether or not a selective trunk reservation and group control are allowed or disallowed. The billing failure free call entry specifies if a call will not be billed if the billing process is unavailable. The billing failure free call will either be enabled for free calls or disabled so that there are no free calls.

FIG. 45D is a continuation of FIG. 45C for the call processor or switch site office table. The maximum (max) hop counts identifies the number of call processor or switch hops that may be made in a single call. The maximum (max) table lookups identifies the number of table lookups that may performed for a single call. This value is used to detect loops in routing tables.

FIGS. 46A-46B depict an example of an advanced intelligent network (AIN) event parameters table. The AIN event parameters table has two columns. The first identifies the parameters that will be included in the parameters portion of the TCAP event message. The second entry may include information for analysis.

FIG. 47 depicts an example of a message mapping table. This table allows the call processor to alter information in outgoing messages. The message type field is used as a key to enter the table and represents the outgoing standard message type. The parameters entry is a pertinent parameter within the outgoing message. The indexes point to various entries in the trunk group and determine if parameters are passed unchanged, omitted, or modified in the outgoing messages.

Those skilled in the art will appreciate that variations from the specific 20 embodiments disclosed above are contemplated by the invention. The invention should not be restricted to the above embodiments, but should be measured by the following claims.

The invention claimed is:

1. A communication system to handle a plurality of calls comprising:
    a plurality of call processors that process signaling messages for the calls, and in response, transfer control messages for the calls and transfer data messages for the calls;
    a plurality of interworking units that receive the control messages and user communications for the calls and interwork the user communications between a first communication format and a second communication format in response to the control messages; and
    a control system that receives and processes the data messages for the calls to maintain an active call database having call data for active ones of the calls, wherein the control system receives a query, and in response, processes the active call database to identify one of the active calls that satisfies the query.

2. The communication system of claim 1 wherein the control system identifies the one of the active calls that satisfies the query to perform call tapping.

3. The communication system of claim 1 wherein the control system identifies the one of the active calls that satisfies the query to perform call tracing.

4. The communication system of claim 1 wherein the control system identifies the one of the active calls that satisfies the query to perform fraud detection.

5. The communication system of claim 1 wherein the control system processes the active call database to determine loading for the call processors.

6. The communication system of claim 1 wherein the control system processes the active call database to generate billing records for the calls.

7. The communication system of claim 1 wherein the call processors transfer the data messages at initiation and termination of the calls.

8. The communication system of claim 1 wherein the active call database having the call data for the active calls indicates a call processor for each one of the active calls.

9. The communication system of claim 1 wherein the active call database having the call data for the active calls indicates a calling number and a celled number for each one of the active calls.

10. The communication system of claim 1 wherein the active call database having the call data for the active calls indicates equipment and communication paths used for each one of the active calls.

11. A method of operating a communication system to handle a plurality of calls, the method comprising:
    in a plurality of call processors, processing signaling messages for the calls, and in response, transferring control messages for the calls and transferring data messages for the calls;
    in a plurality of interworking units, receiving the control messages and user communications for the calls and interworking the user communications between a first communication format and a second communication format in response to the control messages; and
    in a control system, receiving and processing the data messages for the calls to maintain an active call database having call data for active ones of the calls, and receiving a query, and in response, processing the active call database to identify one of the active calls that satisfies the query.

12. The method of claim 11 wherein identifying the one of the active calls that satisfies the query comprises performing call tapping.

13. The method of claim 11 wherein identifying the one of the active calls that satisfies the query comprises performing call tracing.

14. The method of claim 11 wherein identifying the one of the active calls that satisfies the query comprises performing fraud detection.

15. The method of claim 11 further comprising, in the control system, processing the active call database to determine loading for the call processors.

16. The method of claim 11 further comprising, in the control system, processing the active call database to generate billing records for the calls.

17. The method of claim 11 wherein transferring the data messages comprises transferring the data messages at initiation and termination of the calls.

18. The method of claim 11 wherein the active call database having the call data for the active calls indicates a call processor for each one of the active calls.

19. The method of claim 11 wherein the active call database having the call data for the active calls indicates a calling number and a celled number for each one of the active calls.

20. The method of claim 11 wherein the active call database having the call data for the active calls indicates equipment and communication paths used for each one of the active calls.

* * * * *